US012782911B2

(12) United States Patent
Hatada et al.

(10) Patent No.: US 12,782,911 B2
(45) Date of Patent: Nov. 3, 2026

(54) CONTROL SYSTEM INCLUDING MACHINE AND TOOL, CONTROLLER FOR CONTROLLING THE MACHINE AND/OR THE TOOL, AND EXTERNAL DEVICE CONNECTED TO THE CONTROLLER

(71) Applicant: Fanuc Corporation, Minamitsuru-gun (JP)

(72) Inventors: Masanobu Hatada, Minamitsuru-gun (JP); Kensuke Ayato, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 481 days.

(21) Appl. No.: 18/278,217

(22) PCT Filed: Mar. 2, 2022

(86) PCT No.: PCT/JP2022/008957
§ 371 (c)(1),
(2) Date: Aug. 22, 2023

(87) PCT Pub. No.: WO2022/191004
PCT Pub. Date: Sep. 15, 2022

(65) Prior Publication Data

US 2024/0142938 A1 May 2, 2024

(30) Foreign Application Priority Data

Mar. 8, 2021 (JP) ................................. 2021-036433

(51) Int. Cl.

| | |
|---|---|
| ***G05B 19/408*** | (2006.01) |
| ***B23K 26/046*** | (2014.01) |
| ***B23K 26/082*** | (2014.01) |

(52) U.S. Cl.
CPC ........ *G05B 19/4086* (2013.01); *B23K 26/046* (2013.01); *B23K 26/082* (2015.10); *G05B 2219/33259* (2013.01)

(58) Field of Classification Search
CPC ...... G05B 19/4086; G05B 2219/33259; B23K 26/082; B23K 26/046
(Continued)

(56) References Cited

U.S. PATENT DOCUMENTS 7,974,735 B2 7/2011 Irie et al.
8,103,381 B2 1/2012 Fukawa
(Continued)

FOREIGN PATENT DOCUMENTS

CN 102365595 A 2/2012
CN 103706568 A 4/2014
(Continued)

OTHER PUBLICATIONS

International Search Report and Written Opinion for International Application No. PCT/JP2022/008957, dated May 17, 2022, 5 pages.
(Continued)

*Primary Examiner* — Jigneshkumar C Patel
(74) *Attorney, Agent, or Firm* — BUCHANAN INGERSOLL & ROONEY PC

(57) ABSTRACT

This control system includes a machine and a tool driven and controlled by using independent coordinate systems that differ from each other, and a control device that controls at least one of the machine or tool. The control system comprises a conversion unit that converts the coordinate systems, and a storage unit that stores, in the coordinate values of a shared coordinate system shared with the machine and tool, at least one of a specific position and orientation that are not shared between the machine and tool.

11 Claims, 16 Drawing Sheets

(58) Field of Classification Search
USPC .......................................................... 700/186
See application file for complete search history.

(56) References Cited

U.S. PATENT DOCUMENTS

| | | | | |
|---|---|---|---|---|
| 8,742,290 | B2 | 6/2014 | Oe et al. | |
| 2006/0157455 | A1* | 7/2006 | Kawai .................... | B23K 26/22 219/121.64 |
| 2007/0075055 | A1* | 4/2007 | Komatsu ............ | B23K 26/0884 219/121.81 |
| 2008/0161964 | A1* | 7/2008 | Irie .................... | B23K 26/0884 700/258 |
| 2010/0174407 | A1* | 7/2010 | Fukawa ............ | B23K 26/0884 901/14 |
| 2012/0022682 | A1 | 1/2012 | Nakamura et al. | |
| 2012/0255938 | A1* | 10/2012 | Oe ..................... | B23K 26/0884 901/41 |
| 2014/0327746 | A1 | 11/2014 | Dubois et al. | |
| 2019/0105774 | A1 | 4/2019 | Oyama et al. | |
| 2020/0009742 | A1 | 1/2020 | Suzuki et al. | |
| 2020/0114467 | A1 | 4/2020 | Nogami | |

FOREIGN PATENT DOCUMENTS

| | | | |
|---|---|---|---|
| CN | 111037090 | A | 4/2020 |
| JP | H06-230813 | A | 8/1994 |
| JP | 2004351450 | A | 12/2004 |
| JP | 2005326341 | A | 11/2005 |
| JP | 2006187803 | A | 7/2006 |
| JP | 2007098464 | A | 4/2007 |
| JP | 2008229662 | A | 10/2008 |
| JP | 2012218029 | A | 11/2012 |
| JP | 2019069500 | A | 5/2019 |
| JP | 2020006469 | A | 1/2020 |
| JP | 2020044564 | A | 3/2020 |
| JP | 2020059054 | A | 4/2020 |

OTHER PUBLICATIONS

Li, "Computer-Integrated Manufacturing: CAD/CAM/MIS" Aviation Industry Press, (Jan. 1996), pp. 148-151 with partial English translation from the Chinese Office Action dated Jul. 28, 2026. (8 pages).

* cited by examiner

CONTROL SYSTEM INCLUDING MACHINE AND TOOL, CONTROLLER FOR CONTROLLING THE MACHINE AND/OR THE TOOL, AND EXTERNAL DEVICE CONNECTED TO THE CONTROLLER

CROSS REFERENCE TO RELATED APPLICATIONS

This is the U.S. National Phase application of PCT/JP2022/008957, filed Mar. 2, 2022, which claims priority to Japanese Patent Application No. 2021-036433, filed Mar. 8, 2021, the disclosures of each of these applications being incorporated herein by reference in their entireties for all purposes.

FIELD OF THE INVENTION

The present invention relates to a control technology, and in particular, relates to a control system for controlling using independent coordinate systems which are different from each other, as well as a controller, and an external device.

BACKGROUND OF THE INVENTION

In control systems for controlling using independent coordinate systems which are different from each other, how to communize specific non-common positions is a problem. For example, in a general remote laser processing system composed of a robot and a galvanometer scanner, the robot and the galvanometer scanner are driven and controlled using different and independent coordinate systems. The robot controller has coordinate values in a coordinate system fixed in space, while the galvano scanner controller has coordinate values in a coordinate system fixed on the galvano scanner housing. Since the robot controller and galvano scanner controller do not have a common coordinate system, for example, a laser irradiation position on the workpiece cannot be stored in the same coordinate system, or displayed or moved in the same coordinate system, which is inconvenient. The following literature is known as background art related to the present disclosure.

Patent Literature 1 describes a laser machining system comprising a robot, a laser irradiation device attached to the tip of the robot, and a robot controller which controls the operations of the robot and the laser irradiation device, wherein the robot controller comprises a laser light scan control unit, and the laser light scan control unit converts the processing point center coordinates of the processing pattern and a plurality of point sequence coordinates defined by the offset amount from the processing point center coordinates, which are expressed by the coordinates of the same coordinate system as the workpiece, to the coordinates of the coordinate system of the robot.

Patent Literature 2 discloses coordinate conversion between a robot reference coordinate system, a flange coordinate system in which the origin is set on a flange surface of a tip of the robot, and a tool coordinate system in which the origin is placed at an arbitrary position on the operation tool. Patent Literature 2 describes, as the operation tool, a hand, an arc welding tool, and a sealing tool.

Patent Literature 3 discloses a laser machining device, comprising a machining head which machines an object by irradiating laser light in a scanning manner, a robot mounted on the machining head, a robot controller for controlling movement of the robot in accordance with a robot program, and a head controller for controlling the scanning movement of the machining head in accordance with a scan program, wherein information regarding the position and posture of the robot are changed based on the current position and posture of the robot and a specified offset amount, and an alarm signal is output when the changed information and the scan operation exceed a predetermined movable range of the machining head.

Patent Literature 4 describes that there are provided a laser irradiation device for irradiating a workpiece with a laser beam, a workpiece moving device for moving the workpiece, a laser irradiation controller for controlling the irradiation position of the laser beam by controlling the laser irradiation device, and a workpiece movement controller for controlling the workpiece movement device to control at least one of the position and posture of the workpiece, wherein the workpiece movement controller transmits information regarding at least one of the position and posture of the workpiece to the laser irradiation controller, and the laser irradiation controller corrects the irradiation position of the laser light based on the information received from the workpiece movement controller.

Patent Literature 5 describes cell culture equipment for single cell manipulation support robots, wherein, using the first and second feature points formed on a dish, which is cell culture equipment, and a current position detection function of each axis of a table of the single cell manipulation support robot itself, a conversion matrix for converting a table coordinate system to a dish coordinate system is determined, each cell position in the dish coordinate system is determined by multiplying the position of each cell detected based on the table coordinate system by the conversion matrix, and these cell positions are registered in a file corresponding to an identification name for identifying the dish. Patent Literature 5 further describes determining an inverse conversion matrix which replaces the coordinate values registered in the file with coordinate values of the table coordinate system based on the dish coordinate system, and multiplying the coordinate value based on the dish coordinate system by the inverse conversion matrix to determine the cell position corresponding to the coordinate values in the table coordinate system, i.e., the absolute movement target position required to determine the cell position by driving and controlling the table according to the table coordinate system.

PATENT LITERATURE

[PTL 1] JP 2008-229662 A
[PTL 2] JP 2019-069500 A
[PTL 3] JP 2020-044564 A
[PTL 4] JP 2020-059054 A
[PTL 5] JP 2005-326341 A

SUMMARY OF THE INVENTION

In light of the problems of the prior art, the present invention aims to improve convenience in technology for controlling using independent coordinate systems which are different from each other.

One aspect of the present disclosure provides a control system, comprising a machine and a tool which are driven and controlled using independent coordinate systems which are different from each other, and a controller which controls at least one of the machine and the tool, the control system comprising a conversion unit for converting coordinate systems, and a storage unit in which at least one of a specific position and posture not common between the machine and the tool is stored as coordinate values of a common coordinate system which is common between the machine and the tool.

Another aspect of the present disclosure provides a controller for controlling at least one of a machine and a tool which are driven and controlled using independent coordinate systems which are different from each other, the controller comprising a conversion unit for converting coordinate systems, and a storage unit in which at least one of a specific position and posture not common between the machine and the tool is stored as information of a common coordinate system which is common between the machine and the tool.

Yet another aspect of the present disclosure provides an external device which can be connected to a controller for controlling at least one of a machine and a tool which are driven and controlled using independent coordinate systems which are different from each other, the external device comprising a conversion unit for converting coordinate systems, and a storage unit in which at least one of a specific position and posture not common between the machine and the tool is stored as information of a common coordinate system which is common between the machine and the tool.

According to the aspect of the present disclosure, convenience in technology for controlling using independent coordinate systems which are different from each other can be improved.

DETAILED DESCRIPTION OF EMBODIMENTS OF THE INVENTION

Figure 1:
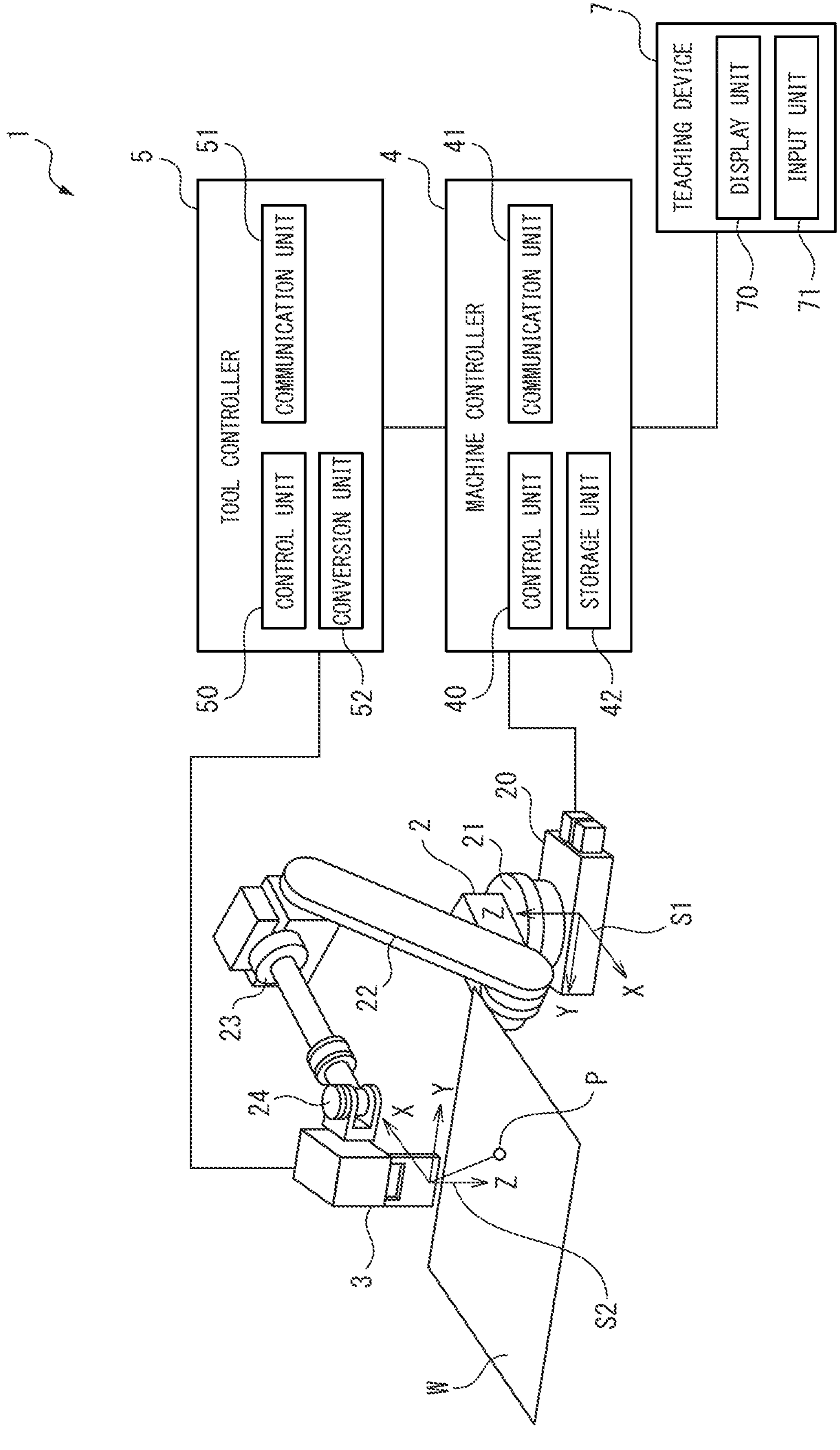
FIG. 1 is a configuration view of a control system according to a first embodiment.

The embodiments of the present disclosure will be described below with reference to the attached drawings. In the drawings, identical or similar constituent elements have been assigned the same or similar reference signs. Furthermore, the embodiments described below do not limit the technical scope of the invention or the definitions of the terms described in the claims.

The control system 1 of the first embodiment will be described below. FIG. 1 is a configuration view of the control system 1 of the first embodiment. The control system 1 of the first embodiment comprises a machine 2, a tool 3 attached to the tip of the machine 2, a machine controller 4 for controlling the machine 2, and a tool controller 5 for controlling the tool 3. The machine 2 conveys the tool 3, and the tool 3 performs operations (for example, machining, measurement, observation, etc.) on a workpiece W arranged at a fixed point. The control system 1 may further comprise a teaching device 7 communicatively connected to the machine controller 4. A user operates the machine controller 4 via the teaching device 7. The machine controller 4 and the tool controller 5 each comprise a computer device (not illustrated) including a processor such as a CPU (central processing unit) for executing programs, RAM (random access memory), ROM (read-only memory) and other memories. Though the "units" described herein are constituted by, for example, program modules executed by a processor, they may be constituted by one or more semiconductor integrated circuits or other hardware which does not execute programs.

The machine controller 4 comprises a control unit 40 for controlling the machine 2 and the tool controller 5 comprises a control unit 50 for controlling the tool 3. The control unit 40 controls the operations of the machine 2 using a first coordinate system S1, and the control unit 50 controls the operations of the tool 3 using a second coordinate system S2. The machine 2 and the tool 3 are driven and controlled using independent coordinate systems which are different from each other. Specifically, the machine 2 is driven and controlled using the first coordinate system S1, and the tool 3 is driven and controlled using the second coordinate system S2. The control system 1 has a function for storing, displaying, or inputting at least one of a specific position and posture not common between the machine 2 and tool 3 using a common coordinate system common between the machine 2 and the tool 3.

The first coordinate system S1 is a coordinate system used in the control of the machine 2. For example, the first coordinate system S1 is a machine coordinate system fixed to a reference position of the machine 2, but it may be a world coordinate system fixed in space, a user coordinate system fixed in space by the user, or the like. Further, in the control system 1 of the first embodiment, since the workpiece W is arranged at a fixed point, the first coordinate system S1 may be a workpiece coordinate system fixed to the reference position of the workpiece W. The first coordinate system S1 will be described as the machine coordinate system below.

The second coordinate system S2 is the coordinate system used in the control of the tool 3. For example, the second coordinate system S2 is a tool coordinate system fixed to a reference position of the tool 3, but it may be a user coordinate system fixed on the tool 3 by the user. Further, in the control system 1 of the first embodiment, since the tool 3 is attached to the tip of the machine 2, the second coordinate system S2 may be a flange coordinate system fixed to the tip of the machine 2. The second coordinate system S2 will be described as the tool coordinate system below.

The common coordinate system is a coordinate system that is fixed in space. For example, though the common coordinate system is the first coordinate system S1, in an embodiment in which the tool 3 is attached to a fixed point, which is described later, the common coordinate system may be the second coordinate system S2. Below, the common coordinate system is described as the first coordinate system S1. As used herein, the term "coordinate system" refers to an orthogonal coordinate system represented by mutually orthogonal X, Y, and Z axes, but it may be other types of coordinate systems such as oblique coordinate systems or polar (spherical) coordinate systems.

The machine controller 4 retains information of the first coordinate system S1, and the tool controller 5 retains information of the second coordinate system S2. To share the coordinate system, the machine controller 4 and the tool controller 5 are communicatively connected to other devices respectively. The machine controller 4 comprises a communication unit 41 for transmitting/receiving various information to/from other devices, and the tool controller 5 comprises a communication unit 51 for transmitting/receiving various information to/from other devices.

In the control system 1 of the first embodiment, the tool controller 5 comprises a conversion unit 52 which converts the coordinate system, and the machine controller 4 comprises a storage unit 42 which stores the converted coordinate system. The conversion unit 52 converts or de-converts the coordinate system of at least one of the specific position and posture not common between the machine 2 and the tool 3 to the common coordinate system. The storage unit 42 stores at least one of the specific position and posture as information in the common coordinate system. As a result, at least one of the specific position and posture not common between the machine 2 and the tool 3 can be shared as information in the common coordinate system common between the machine 2 and the tool 3, whereby convenience of the control system 1, which performs control using independent coordinate systems which are different from each other, is improved.

The teaching device 7 comprises a display unit 70 for displaying various information and an input unit 71 for inputting various information. Though the display unit 70 and input unit 71 are composed of program modules executed by the processor, the display unit 70 may be, for example, a display device, and the input unit 71 may be, for example, a keyboard. The display unit 70 displays at least one of the specific position and posture not common between the machine 2 and the tool 3 as the information in the common coordinate system. As a result, the user can confirm at least one of the specific position and posture not common between the machine 2 and the tool 3 as the information in the common coordinate system common between the machine 2 and the tool 3, whereby the convenience of the control system 1, which performs control using independent coordinate systems which are different from each other, is further improved.

The input unit 71 inputs a movement command (for example, at least one of a target position and a target posture) for moving at least one of the specific position and posture not common between the machine 2 and the tool 3 as information of a common coordinate system common between the machine 2 and the tool 3. For example, the movement command includes various commands such as a linear movement command and an arcuate movement command. As a result, the movement command (for example, a target position and a target posture) of the at least one of the specific position and posture not common between the machine 2 and the tool 3 can be input as information in the common coordinate system which is common between the machine 2 and the tool 3, whereby the convenience of the control system 1, which performs control using independent coordinate systems which are different from each other, is further improved.

An example of the control system 1 of the first embodiment will be described. For example, the control system 1 is a laser machining system, the machine 2 is a vertical articulated robot, and the machine controller 4 is a robot controller. The machine 2 is, for example, a robot, and comprises a plurality of links 20 to 24 which are connected so as to be capable of moving relative to each other, and a plurality of motors (not illustrated) for driving the respective links 21 to 24. For example, the link 20 is a base which is installed on an installation surface, and the link 21 is a revolving barrel which is supported so as to be capable of being rotated relative to the base about a first axis extending in a direction orthogonal to the installation surface. For example, the link 22 is a first arm which is supported so as to be capable of rotating relative to the revolving barrel about a second axis extending in a direction perpendicular to the first axis, the link 23 is a second arm which is supported so as to be capable of rotating relative to the first arm about a third axis parallel to the second axis, and the link 24 is a three-axis wrist unit which is supported so as to be capable of rotating relative to the second arm.

The machine controller 4 converts the position and posture of the machine 2 in the first coordinate system S1 to a position of the motor in the joint coordinate system of each joint of the links 20 to 24 by inverse kinematics to control the motor. For example, the position and posture of machine 2 are the position and posture of the tool coordinate system or the flange coordinate system in the machine coordinate system.

Figure 2:
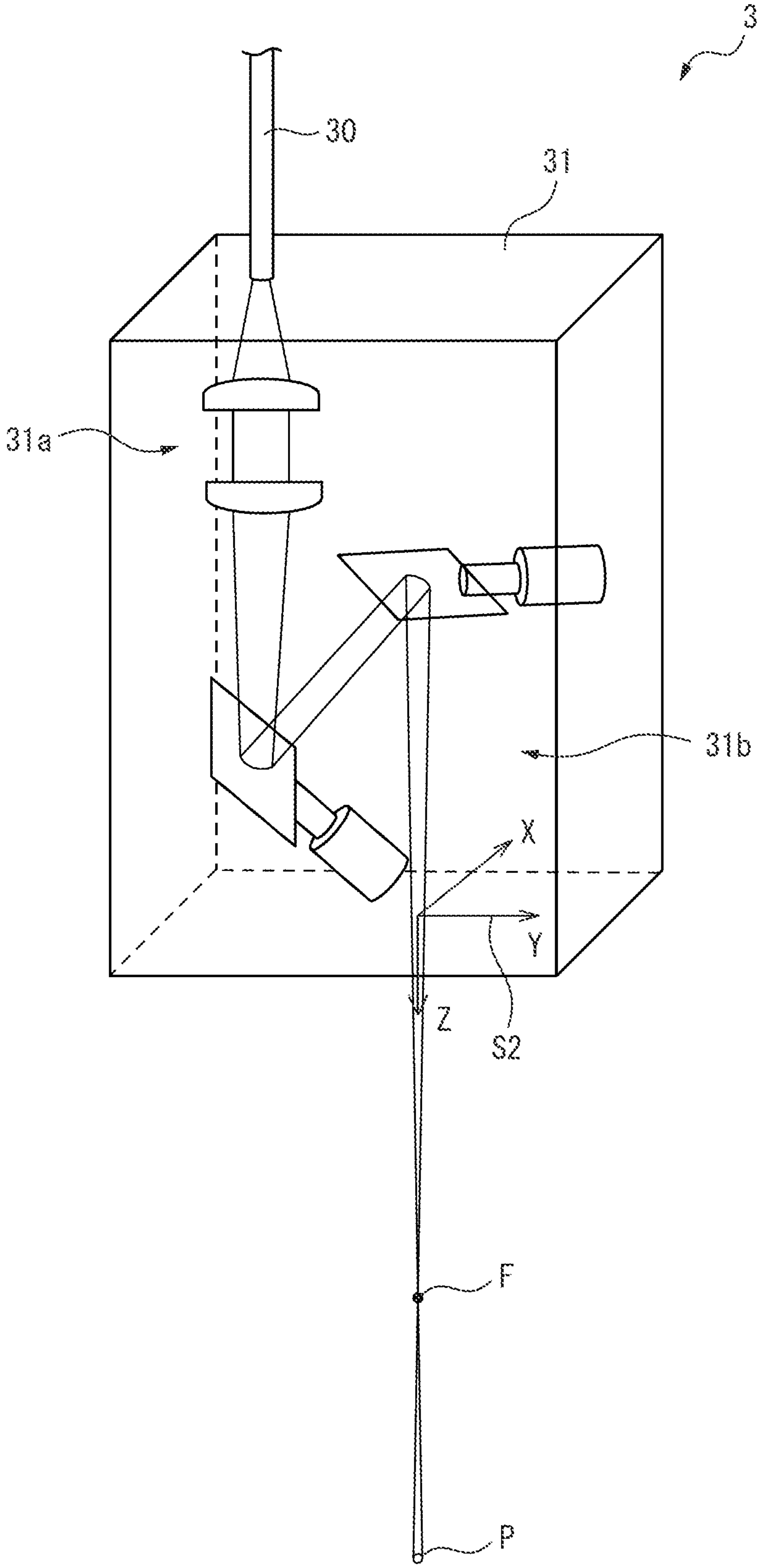
FIG. 2 is a perspective view showing an example of a tool.

For example, the tool 3 is a laser machining tool and the tool controller 5 is a machining tool controller. FIG. 2 is a perspective view showing an example of the tool 3. For example, the tool 3 comprises an output unit (not illustrated) for outputting a beam. The output unit is, for example, a laser oscillator. The tool 3 may also comprise a focusing unit 31*a* for focusing the beam and a scanning unit 31*b* for scanning the beam. The focusing unit 31*a* and the scanning unit 31*b* are accommodated in, for example, a machining head 31, and the machining head 31 is attached to, for example, the tip of the machine 2. For example, the focusing unit 31*a* comprises a focusing lens for focusing the beam output from the optical fiber 30 connected to the laser oscillator, and a motor (not illustrated) for driving the focusing lens in the Z-axis direction of the second coordinate system S2, and moves the focal position F of the beam. For example, the scanning unit 31*b* is a galvanometer scanner, comprises two scan mirrors for scanning the beam in the X-axis and Y-axis directions of the second coordinate system S2 and two motors for driving the two scan mirrors, and moves the irradiation position P of the beam on the workpiece W. The focal position F and focal posture of the beam and the irradiation position P and irradiation posture of the beam are examples of specific positions and postures not common between the machine 2 and the tool 3. Specifically, the tool controller 5 retains at least one of the beam focal position F, focal posture, irradiation position P, and irradiation posture as the information of the second coordinate system S2, and the machine controller 4 does not retain these specific positions and postures as information of the first coordinate system S1.

The tool controller 5 commands beam output conditions to the output unit (not illustrated). The beam output conditions include, for example, beam power, oscillation frequency, and duty ratio. The input unit 71 of the teaching device 7 may input the beam output conditions by means of operation of the user. Furthermore, the tool controller 5 converts a movement command (for example, at least one of a target position and a target posture) of at least one of the focal position F and the focal posture of beam in second coordinate system S2 to at least one of a movement command (for example, a target position) of the motor of the focusing unit 31*a* and movement commands (for example, target positions) of the two motors of scanning unit 31*b* for controlling at least one of the focusing unit 31*a* and the scanning unit 31*b*. Further, the tool controller 5 converts a movement command (for example, at least one of a target position and a target posture) of at least one of the irradiation position P and the irradiation posture of the beam in second coordinate system S2 to movement commands (for example, target positions) of the two motors of scanning unit 31*b* for controlling the scanning unit 31*b*.

For example, when the machine 2 moves the tool 3 (for example, when the teaching of the machine 2 are modified), since at least one of the position and posture of the tool 3 is changed, it is necessary to change at least one of the irradiation position P and irradiation posture of the beam in the second coordinate system S2. Thus, when the machine 2 moves the tool 3, the tool controller 5 receives the position and posture of the tool 3 in the first coordinate system S1 from the machine controller 4, converts the position and posture of the tool 3 in the first coordinate system S1 to information in the second coordinate system S2, and generates a movement command (for example, at least one of a target position and a target posture) for at least one of the irradiation position P and the irradiation posture of the beam in the second coordinate system S2 based on the position and posture of the tool 3 in the second coordinate system S2 and the position and posture of the workpiece W in the second coordinate system S2. The tool controller 5 then converts the movement command (for example, at least one of a target position and a target posture) of at least one of the irradiation position P and the irradiation posture of beam in second coordinate system S2 to movement commands (for example, target positions) of the two motors of the scanning unit 31*b* for controlling the scanning unit 31*b*. Thus, the tool controller 5 always retains at least one of the current irradiation position P and irradiation posture of the beam in the second coordinate system S2.

It should be noted that the above configuration of the control system 1 is an example and various modifications can be made. For example, the control system 1 may not be a laser processing system, and may be a machining system, a measurement system, or an observation system using various beams such as electron beams, ion beams, microwave beams, X-ray beams, ultrasonic beams, and water jet beams. Specifically, it is sufficient that the control system 1 be a system which performs control using independent coordinate systems which are different from each other.

For example, the machine 2 may be a horizontal articulated robot, a parallel link robot, an orthogonal robot, a humanoid, or a machine tool instead of a vertical articulated robot. For example, the tool 3 may not be a laser machining tool, but may be a machining tool, a measurement tool, or an observation tool using other beams such as electron beams, ion beams, microwave beams, X-ray beams, ultrasonic beams, and water jet beams. Specifically, it is sufficient that the machine 2 and the tool 3 be driven and controlled using independent coordinate systems which are different from each other.

Furthermore, for example, in the focusing unit 31*a*, in the case of an electron beam, ion beam, microwave beam, or X-ray beam, the focusing lens is preferably an electron lens, in the case of an ultrasonic beam, the focusing lens is preferably an acoustic lens, and in the case of a water jet beam, a focus nozzle is preferably used in place of a focusing lens. For example, the scanning unit 31*b* may be a MEMS (micro electromechanical systems) scanner instead of a galvanometer scanner. For example, in the case of an electron beam, an ion beam, a microwave beam, an X-ray beam, or an ultrasonic beam, the scanning unit 31*b* preferably has a scanning probe instead of a scanning mirror, and in the case of a waterjet beam, a scanning nozzle is preferably used in place of a scanning mirror.

Figure 3:
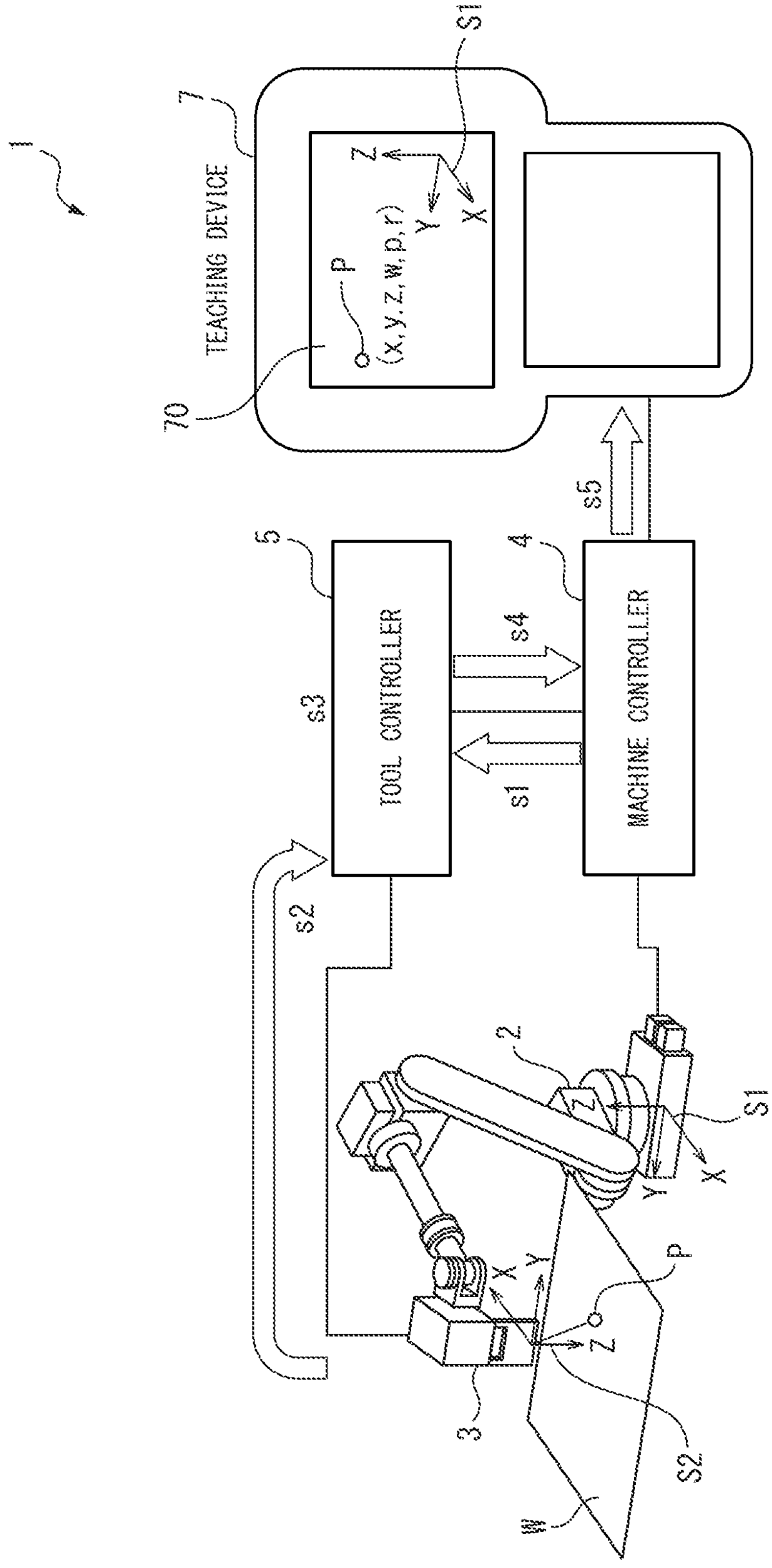
FIG. 3 is an operation view of the control system according to the first embodiment.

FIG. 3 is an operational view of the control system 1 of the first embodiment. In step s1, the machine controller 4 sends information necessary for coordinate conversion to the tool controller 5. The information necessary for coordinate conversion includes, for example, the position and posture of the tool 3 in the first coordinate system S1 (for example, the position and posture of the tool coordinate system ($x_{offset}$, $y_{offset}$, $z_{offset}$, (φ, θ, ψ)). As used herein, $x_{offset}$, $y_{offset}$, $z_{offset}$ are the position of the tool 3 in the first coordinate system S1 (for example, the origin of the tool coordinate system), and φ, θ, and ψ are the posture of the tool 3 in the first coordinate system S1 (for example, the amounts of rotation about the X, Y, and Z axes of the tool coordinate system).

In step s2, the tool controller 5 acquires at least one of the specific position and posture (for example, the current irradiation position P and irradiation posture of the beam) not common between the machine 2 and the tool 3 as the information ($x_{s2}$, $y_{s2}$, $z_{s2}$, $w_{s2}$, $p_{s2}$, $r_{s2}$) of the second coordinate system S2. As used herein, $x_{s2}$, $y_{s2}$, and $z_{s2}$ are the specific position in the second coordinate system S2 (for example, the irradiation position P of the beam), and $w_{s2}$, $p_{s2}$, and $r_{s2}$ are the specific posture in the second coordinate system S2 (for example, the irradiation posture of the beam (rotations about the X, Y, and Z axes)).

In step s3, the tool controller 5 converts at least one of the specific position and posture (for example, the current irradiation position P and irradiation posture ($x_{s2}$, $y_{s2}$, $z_{s2}$, $w_{s2}$, $p_{s2}$, $r_{s2}$) of the beam) in the second coordinate system S2 to information (x, y, z, w, p, r) in the common coordinate system (for example, the first coordinate system S1) common between the machine 2 and the tool 3 based on the information (for example, the position and posture ($x_{offset}$, $y_{offset}$, $z_{offset}$, φ, θ, ψ) of the tool 3 in the first coordinate system S1) necessary for coordinate conversion received from the machine controller 4. For example, the coordinate conversion formulas are as follows. As used herein, x, y, and z are the specific position in the common coordinate system (for example, the irradiation position P of the beam), and w, p, and r are the specific posture in the common coordinate system (for example, the irradiation posture of the beam (rotations about the X, Y, and Z axes)).

[Math 1]

$$\begin{bmatrix} x \\ y \\ z \end{bmatrix} = E(\varphi, \theta, \psi)\begin{bmatrix} x_{S2} \\ y_{S2} \\ z_{S2} \end{bmatrix} + \begin{bmatrix} x_{offset} \\ y_{offset} \\ z_{offset} \end{bmatrix} \quad 1$$

Here, the conversion matrix E is, for example, as follows.

[Math 2]

$$E(\varphi,\theta,\psi)=\begin{bmatrix}1&0&0\\0&\cos\varphi&\sin\varphi\\0&-\sin\varphi&\cos\varphi\end{bmatrix}\begin{bmatrix}\cos\theta&0&-\sin\theta\\0&1&0\\\sin\theta&0&\cos\theta\end{bmatrix}\begin{bmatrix}\cos\psi&\sin\psi&0\\-\sin\psi&\cos\psi&0\\0&0&1\end{bmatrix} \quad 2$$

[Math 3]

$$\begin{bmatrix}w\\p\\r\end{bmatrix}=\begin{bmatrix}w_{S2}\\p_{S2}\\r_{S2}\end{bmatrix}+\begin{bmatrix}\varphi\\\theta\\\psi\end{bmatrix} \quad 3$$

In step s4, the tool controller 5 sends, to the machine controller 4, at least one of the specific position and posture (for example, the current irradiation position P and irradiation posture (x, y, z, w, p, r) of the beam) not common between the machine 2 and the tool 3 as information in the common coordinate system common between the machine 2 and the tool 3. The machine controller 4 stores at least one of the specific position and posture (for example, the current irradiation position P and irradiation posture (x, y, z, w, p, r) of the beam) received from the tool controller 5 as the information in the common coordinate system. As a result, at least one of the specific position and posture (for example, the current irradiation position P and irradiation posture of the beam) not common between the machine 2 and the tool 3 can be shared as the information (x, y, z, w, p, r) in the common coordinate system common between the machine 2 and the tool 3, whereby convenience of the control system 1, which performs control using independent coordinate systems which are different from each other, is improved. For example, when the machine 2 moves the tool 3 (for example, modifies the teaching of the machine 2), since at least one of the position and posture of the tool 3 changes, at least one of the specific position and posture (for example, the current irradiation position P and irradiation posture of the beam) in the second coordinate system S2 also changes, but if the processing of steps s1 to s4 is executed, at least one of the specific position and posture (for example, the current irradiation position P and irradiation posture of the beam) not common between the machine 2 and the tool 3 can be shared as the information (x, y, z, w, p, r) in the common coordinate system common between the machine 2 and the tool 3.

In step s5, the teaching device 7 displays at least one of the specific position and posture (for example, the current irradiation position P and irradiation posture of the beam) received from the machine controller 4 as the information (x, y, z, w, p, r) in the common coordinate system. As a result, the user can confirm, on the teaching device 7, at least one of the specific position and posture not common between the machine 2 and the tool 3 as the information (x, y, z, w, p, r) in the common coordinate system common between the machine 2 and the tool 3. For example, when the machine 2 moves the tool 3 (for example, modifies the teaching of the machine 2), since at least one of the position and posture of the tool 3 changes, the specific position and/or posture (for example, the current irradiation position P and irradiation posture of the beam) in the second coordinate system S2 also changes, but if the processing of steps s1 to s5 is executed, the user can confirm, on the teaching device 7, the at least one of the specific position and posture (for example, the current irradiation position P and irradiation posture of the beam) not common between the machine 2 and the tool 3 as the information (x, y, z, w, p, r) in the common coordinate system common between the machine 2 and the tool 3.

Figure 4:
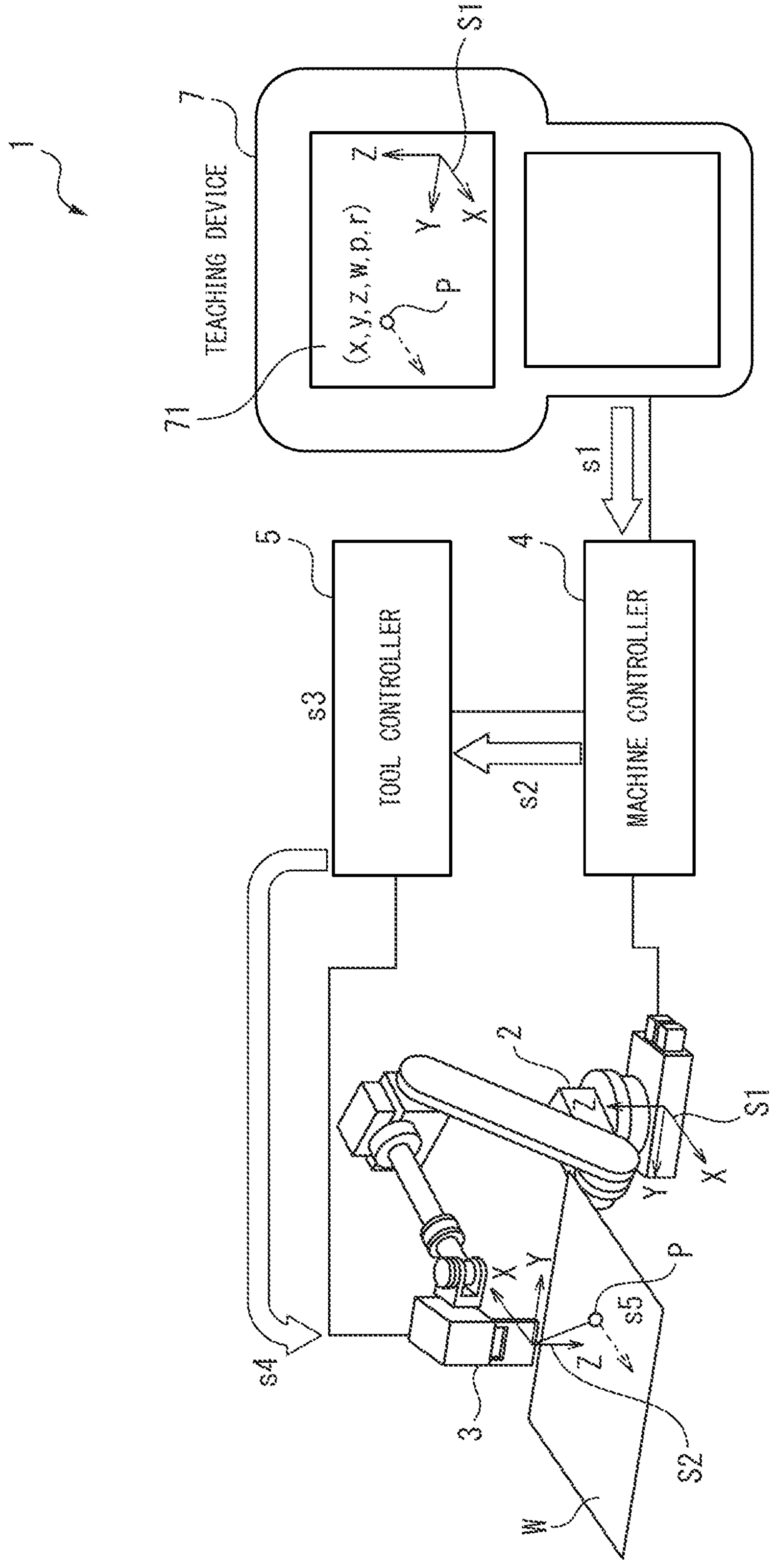
FIG. 4 is another operation view of the control system according to the first embodiment.

FIG. 4 is another operational view of the control system 1 of the first embodiment. In step s1, the teaching device 7 inputs a movement command (for example, at least one of a target position and target posture) for moving at least one of the specific position and posture (for example, the irradiation position P and irradiation posture of the beam) not common between the machine 2 and the tool 3 as the information (x, y, z, w, p, r) in the common coordinate system common between the machine 2 and the tool, which is sent to the machine controller 4.

In step s2, the machine controller 4 sends the movement command (for example, the target position and target posture (x, y, z, w, p, r)) for at least one of the specific position and posture (for example, the irradiation position P and irradiation posture of the beam) in the common coordinate system and the information necessary for coordinate conversion (for example, the position and posture ($x_{offset}$, $y_{offset}$, $z_{offset}$, φ, θ, ψ) of the tool 3 in the first coordinate system S1) to the tool controller 5.

In step s3, the tool controller 5 converts the movement command (for example, at least one of the target position and target posture (x, y, z, w, p, r)) for the at least one of the specific position and posture (for example, the irradiation position P and irradiation posture of the beam) in the common coordinate system (for example, the first coordinate system S1) to the information ($x_{s2}$, $y_{s2}$, $z_{s2}$, $w_{s2}$, $p_{s2}$, $r_{s2}$) in the second coordinate system S2 based on the information necessary for coordinate conversion (for example, the position and posture ($x_{offset}$, $y_{offset}$, $z_{offset}$, φ, θ, ψ) of the tool 3 in the first coordinate system S1) received from the machine controller 4. For example, the coordinate conversion formulas are as follows.

[Math 4]

$$\begin{bmatrix}x_{S2}\\y_{S2}\\z_{S2}\end{bmatrix}=E^{-1}(\varphi,\theta,\psi)\begin{bmatrix}x\\y\\z\end{bmatrix}-\begin{bmatrix}x_{offset}\\y_{offset}\\z_{offset}\end{bmatrix} \quad 4$$

Here, the inverse conversion matrix $E^{-1}$ is the transposed matrix of the conversion matrix E of formula 2.

[Math 5]

$$E^{-1}(\varphi,\theta,\psi)=E^{T}(\varphi,\theta,\psi) \quad 5$$

[Math 6]

$$\begin{bmatrix}w_{S2}\\p_{S2}\\r_{S2}\end{bmatrix}=\begin{bmatrix}w\\p\\r\end{bmatrix}-\begin{bmatrix}\varphi\\\theta\\\psi\end{bmatrix} \quad 6$$

In step s4, the tool controller 5 controls the tool 3 in accordance with the movement command (for example, at least one of the target position and target posture ($x_{s2}$, $y_{s2}$, $z_{s2}$, $w_{s2}$, $p_{s2}$, $r_{s2}$)) for at least one of the specific position and posture (for example, the irradiation position P and irradiation posture of the beam) in the second coordinate system S2. For example, the tool controller 5 converts the movement command (for example, at least one of the target position and target posture ($x_{s2}$, $y_{s2}$, $z_{s2}$, $w_{s2}$, $p_{s2}$, $r_{s2}$)) of at least one of the irradiation position P and the irradiation posture of the beam in the second coordinate system S2 to movement commands (for example, target positions) of the two motors of the scanning unit 31*b* to control the scanning unit 31*b*.

In step s5, the scanning unit 31*b* moves the irradiation position P of the beam in accordance with the motor movement commands (for example, the target positions). As described above, the teaching device 7 can teach the movement command (for example, at least one of the target position and the target posture) for at least one of the specific position and posture (for example, the irradiation position P and irradiation posture of the beam) not common between the machine 2 and the tool 3 as the information (x, y, z, w, p, r) in the common coordinate system common between the machine 2 and the tool 3, whereby the convenience of the control system 1, which controls using independent coordinate systems which are different from each other, is further improved.

Note that the operations of the control system 1 described above are exemplary, and various modifications can be made. For example, the specific position and posture not common between the machine 2 and the tool 3 may be the focal position F and focal posture of the beam. Specifically, the machine controller 4 may store at least one of the current focal position F and focal posture of the beam received from the tool controller 5 as the information (x, y, z, w, p, r) in the common coordinate system, and the teaching device 7 may display at least one of the current focal position F and focal posture of the beam received from the machine controller 4 as the information (x, y, z, w, p, r) in the common coordinate system.

Furthermore, the teaching device 7 may input a movement command (for example, at least one of the target position and target posture) for moving at least one of the focal position F and focal posture of the beam that is not common between the machine 2 and the tool 3 as the information (x, y, z, w, p, r) in the common coordinate system common between the machine 2 and the tool, and the tool controller 5 may convert the movement command (for example, at least one of the target position and target posture ($x_{s2}$, $y_{s2}$, $z_{s2}$, $w_{s2}$, $p_{s2}$, $r_{s2}$)) of at least one of the focal position P and focal posture of the beam converted to the second coordinate system S2 to at least one of a motor movement command (for example, the target position) of the focusing unit 31*a* and the two motor movement commands (for example, the target positions) of the scanning unit 31*b* to control at least one of the focusing unit 31*a* and the scanning unit 31*b*.

Figure 5:
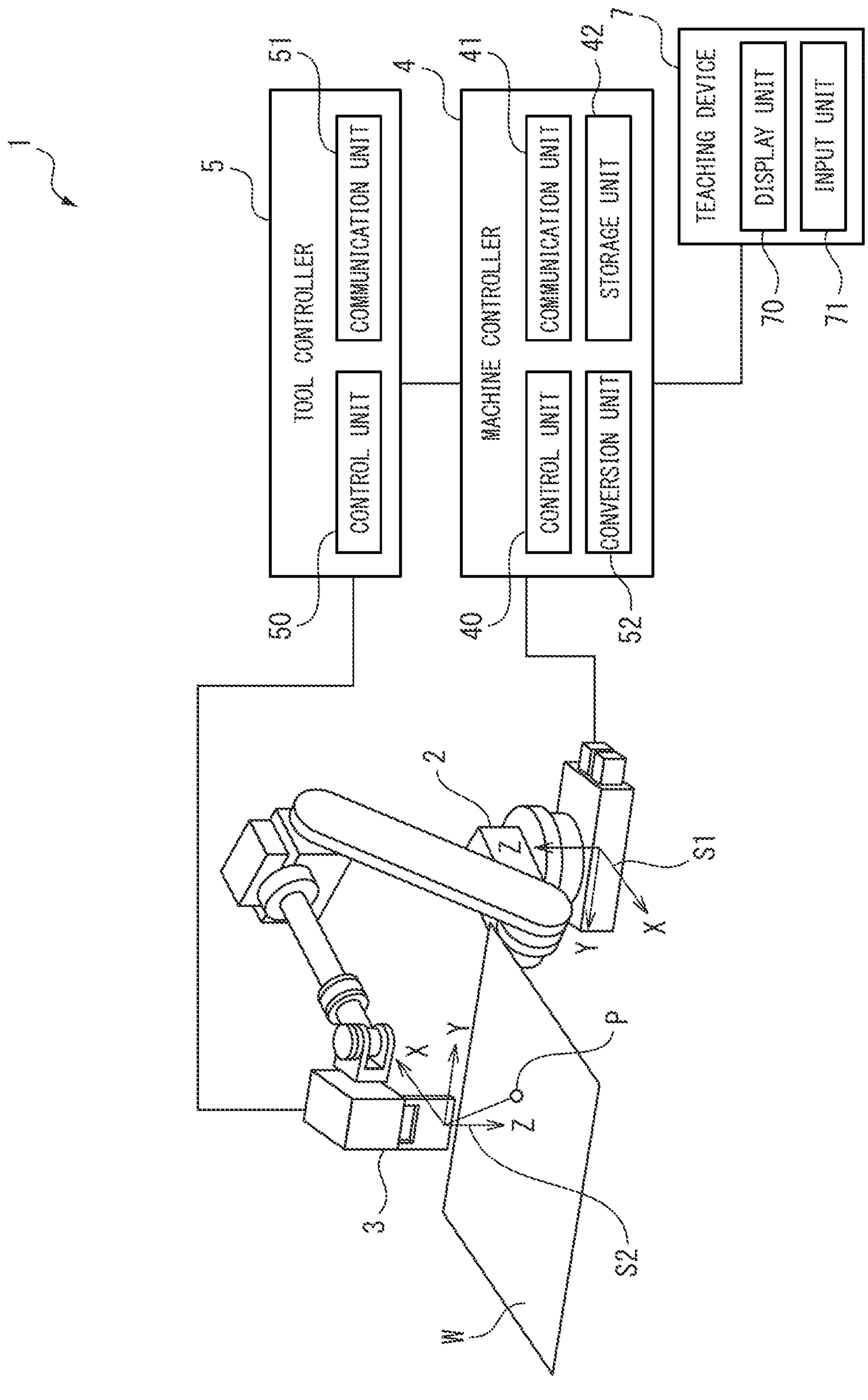
FIG. 5 is a configuration view of a control system according to a second embodiment.

The control system 1 of a second embodiment will be described below. FIG. 5 is a configuration view of the control system 1 of the second embodiment. The control system 1 of the second embodiment differs from the control system 1 of the first embodiment in that the machine controller 4 comprises a conversion unit 52 for converting coordinate systems. Specifically, in the control system 1 of the second embodiment, coordinate conversion is performed not on the tool controller 5 side but on the machine controller 4 side. The rest of the configuration of the control system 1 of the second embodiment is identical to that of the control system 1 of the first embodiment, and thus, description thereof has been omitted.

Figure 6:
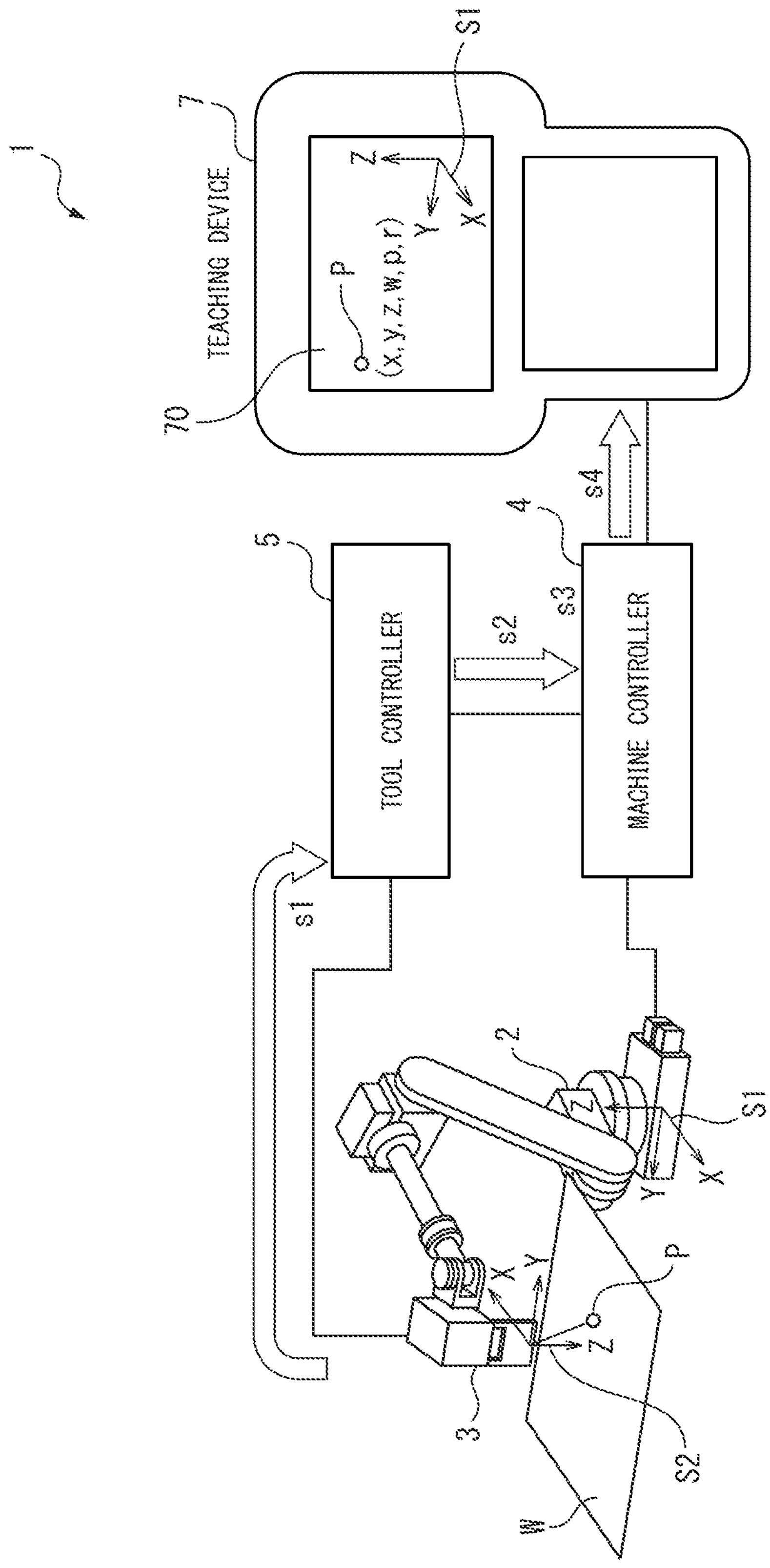
FIG. 6 is an operation view of the control system according to the second embodiment.

FIG. 6 is an operational view of the control system 1 of the second embodiment. In step s1, the tool controller 5 acquires the specific position and/or posture (for example, the current irradiation position P and irradiation posture of the beam) not common between the machine 2 and the tool 3 as the information ($x_{s2}$, $y_{s2}$, $z_{s2}$, $w_{s2}$, $p_{s2}$, $r_{s2}$) of the second coordinate system S2.

In step s2, the tool controller 5 sends to the machine controller 4 at least one of the specific position and posture (for example, the current irradiation position P and irradiation posture ($x_{s2}$, $y_{s2}$, $z_{s2}$, $w_{s2}$, $p_{s2}$, $r_{s2}$) of the beam) not common between the machine 2 and tool 3 as the information of the second coordinate system S2.

In step s3, the machine controller 4 converts and stores at least one of the specific position and posture (for example, the current irradiation position P and irradiation posture ($x_{s2}$, $y_{s2}$, $z_{s2}$, $w_{s2}$, $p_{s2}$, $r_{s2}$) of the beam) in the second coordinate system S2 to information (x, y, z, w, p, r) in the common coordinate system (for example, the first coordinate system S1) common between the machine 2 and the tool 3 based on the information (for example, the position and posture ($x_{offset}$, $y_{offset}$, $z_{offset}$, φ, θ, ψ) of the tool 3 in the first coordinate system S1) necessary for coordinate conversion. As the coordinate conversion formulas, for example, formulas 1 to 3 described above can be used. As a result, at least one of the specific position and posture (for example, the current irradiation position P and irradiation posture of the beam) not common between the machine 2 and the tool 3 can be shared as the information (x, y, z, w, p, r) in the common coordinate system common between the machine 2 and the tool 3, whereby convenience of the control system 1, which performs control using independent coordinate systems which are different from each other, is improved. For example, when the machine 2 moves the tool 3 (for example, modifies the teaching of the machine 2), since at least one of the position and posture of the tool 3 changes, at least one of the specific position and posture (for example, the current irradiation position P and irradiation posture of the beam) in the second coordinate system S2 also changes, but if the processing of steps s1 to s3 is executed, at least one of the specific position and posture (for example, the current irradiation position P and irradiation posture of the beam) not common between the machine 2 and the tool 3 can be shared as the information (x, y, z, w, p, r) in the common coordinate system common between the machine 2 and the tool 3.

In step s4, the teaching device 7 displays at least one of the specific position and posture (for example, the current irradiation position P and irradiation posture (x, y, z, w, p, r) of the beam) received from the machine controller 4 as the information in the common coordinate system. As a result, the user can confirm at least one of the specific position and posture not common between the machine 2 and the tool 3 as the information (x, y, z, w, p, r) in the common coordinate system common between the machine 2 and the tool 3. For example, when the machine 2 moves the tool 3 (for example, modifies the teaching of the machine 2), since at least one of the position and posture of the tool 3 changes, it is necessary to change the specific position and/or posture (for example, the irradiation position P and irradiation posture of the beam) in the second coordinate system S2, but if the processing of steps s1 to s4 is executed, the user can confirm, on the teaching device 7, the at least one of the specific position and posture (for example, the current irradiation position P and irradiation posture of the beam) not common between the machine 2 and the tool 3 as the information (x, y, z, w, p, r) in the common coordinate system common between the machine 2 and the tool 3.

Figure 7:
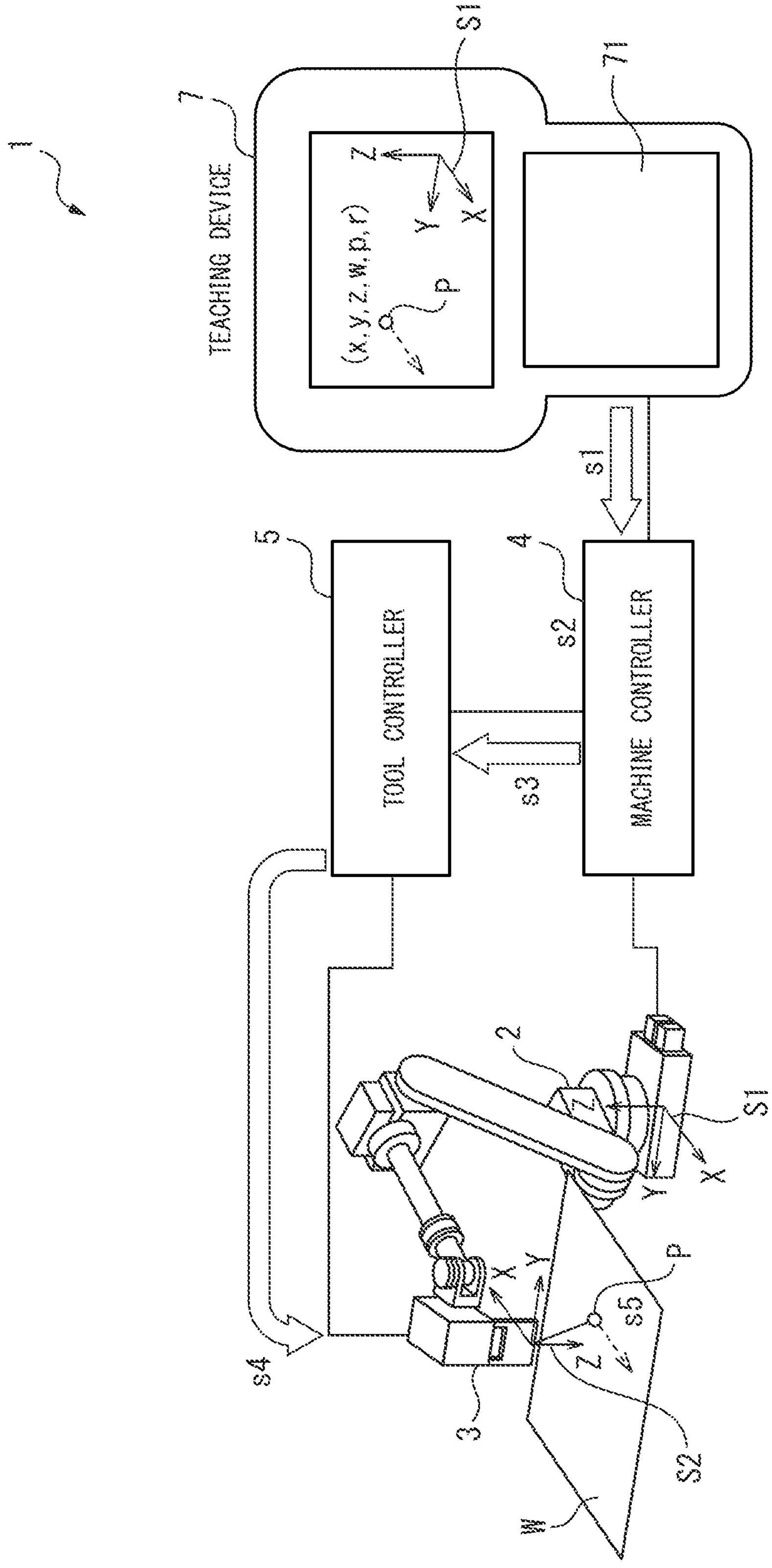
FIG. 7 is another operation view of the control system according to the second embodiment.

FIG. 7 is another operational view of the control system 1 of the second embodiment. In step s1, the teaching device 7 inputs a movement command (for example, at least one of target position and target posture) for moving at least one of the specific position and posture (for example, the irradiation position P and irradiation posture of the beam) not common between the machine 2 and the tool 3 as the information (x, y, z, w, p, r) in the common coordinate system common between the machine 2 and the tool 3, which is sent to the machine controller 4.

In step s2, the machine controller 4 converts the movement command (for example, at least one of the target position and target posture (x, y, z, w, p, r)) for the at least one of the specific position and posture (for example, the irradiation position P and irradiation posture of the beam) in the common coordinate system (for example, the first coordinate system S1) to the information ($x_{s2}$, $y_{s2}$, $z_{s2}$, $w_{s2}$, $p_{s2}$, $r_{s2}$) in the second coordinate system S2 based on the information necessary for coordinate conversion (for example, the position and posture ($x_{offset}$, $y_{offset}$, $z_{offset}$, φ, θ, ψ) of the tool 3 in the first coordinate system S1). As the coordinate conversion formulas, for example, formulas 4 to 6 described above can be used.

In step s3, the machine controller 4 sends, to the tool controller 5, the movement command (for example, at least one of the target position and target posture ($x_{s2}$, $y_{s2}$, $z_{s2}$, $w_{s2}$, $p_{s2}$, $r_{s2}$)) for at least one of the specific position and posture (for example, the irradiation position P and irradiation posture of the beam) in the second coordinate system S2.

In step s4, the tool controller 5 controls the tool 3 in accordance with the movement command (for example, at least one of the target position and target posture ($x_{s2}$, $y_{s2}$, $z_{s2}$, $w_{s2}$, $p_{s2}$, $r_{s2}$)) for at least one of the specific position and posture (for example, the irradiation position P and irradiation posture of the beam) in the second coordinate system S2 received from the machine controller 4. For example, the tool controller 5 converts the movement command (for example, at least one of target position and target posture ($x_{s2}$, $y_{s2}$, $z_{s2}$, $w_{s2}$, $p_{s2}$, $r_{s2}$)) of at least one of the irradiation position P and the irradiation posture of the beam in the second coordinate system S2 to movement commands (for example, target positions) of the two motors of the scanning unit 31*b* to control the scanning unit 31*b*.

In step s5, the scanning unit 31*b* moves the irradiation position P of the beam in accordance with the motor movement commands (for example, the target positions). As described above, the teaching device 7 can teach the movement command (for example, at least one of the target position and the target posture) for at least one of the specific position and posture (for example, the irradiation position P and irradiation posture of the beam) not common between the machine 2 and the tool 3 as the information (x, y, z, w, p, r) in the common coordinate system common between the machine 2 and the tool 3, whereby the convenience of the control system 1, which controls using independent coordinate systems which are different from each other, is further improved.

Figure 8:
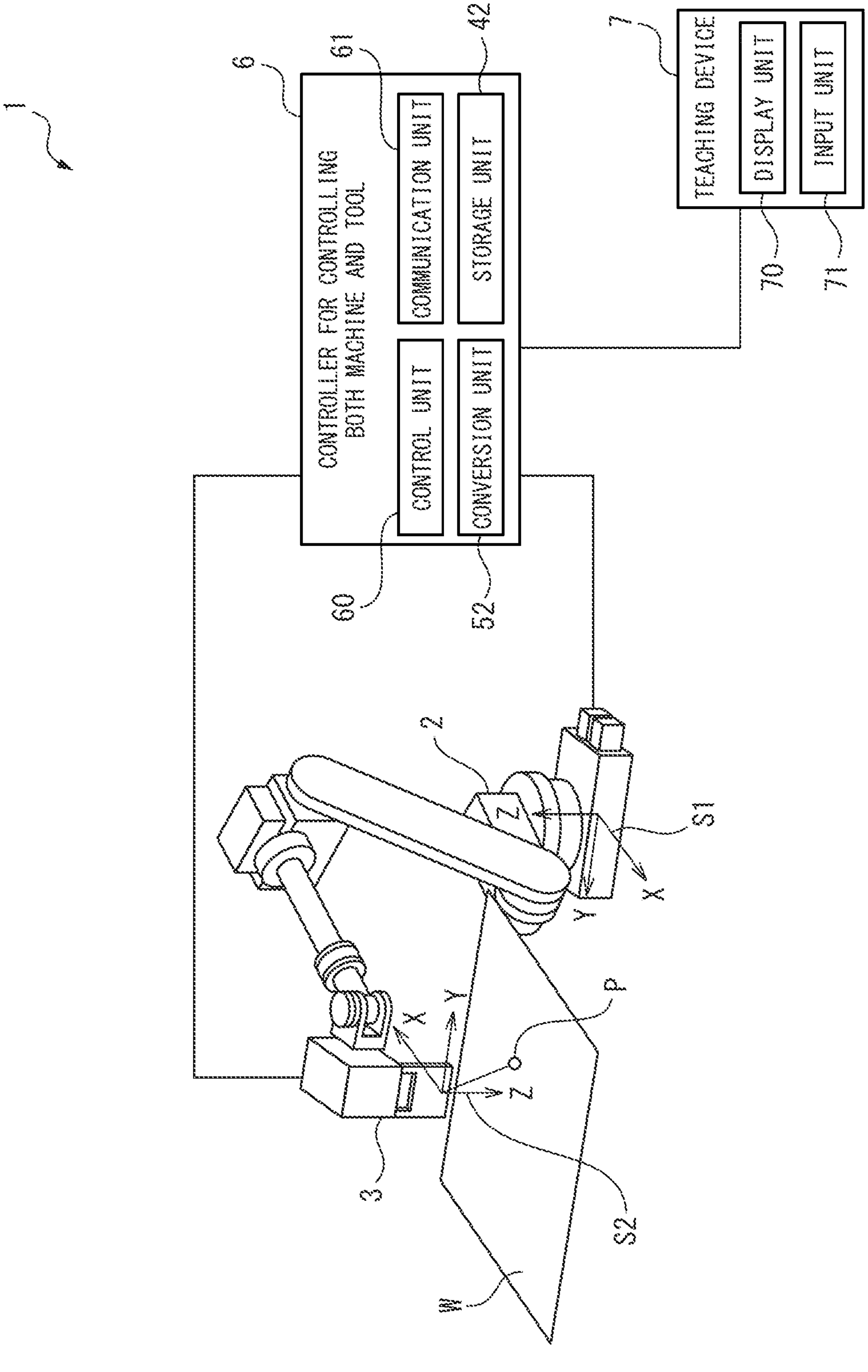
FIG. 8 is a configuration view of a control system according to a third embodiment.

The control system 1 of a third embodiment will be described below. FIG. 8 is a configuration view of the control system 1 of the third embodiment. The control system 1 of the third embodiment differs from the control system 1 of the first embodiment in that it comprises a controller 6 for controlling both the machine 2 and the tool 3. Specifically, in the control system 1 of the third embodiment, the machine controller 4 and the tool controller 5 are integrated into a single controller 6, and the controller 6 for controlling both the machine 2 and the tool 3 (hereinafter simply referred to as "controller 6") controls the machine 2 and the tool 3 using independent coordinate systems which are different from each other. The controller 6 comprises a control unit 60 for controlling both the machine 2 and the tool 3 using independent coordinate systems which are different from each other, and a communication unit 61 for transmitting and receiving various information to and from other devices. The controller 6 also comprises a conversion unit 52 for converting coordinate systems and a storage unit 42 for storing various information. The other configurations of the control system 1 of the third embodiment are the same as those of the control system 1 of the first embodiment, and thus description thereof has been omitted.

Figure 9:
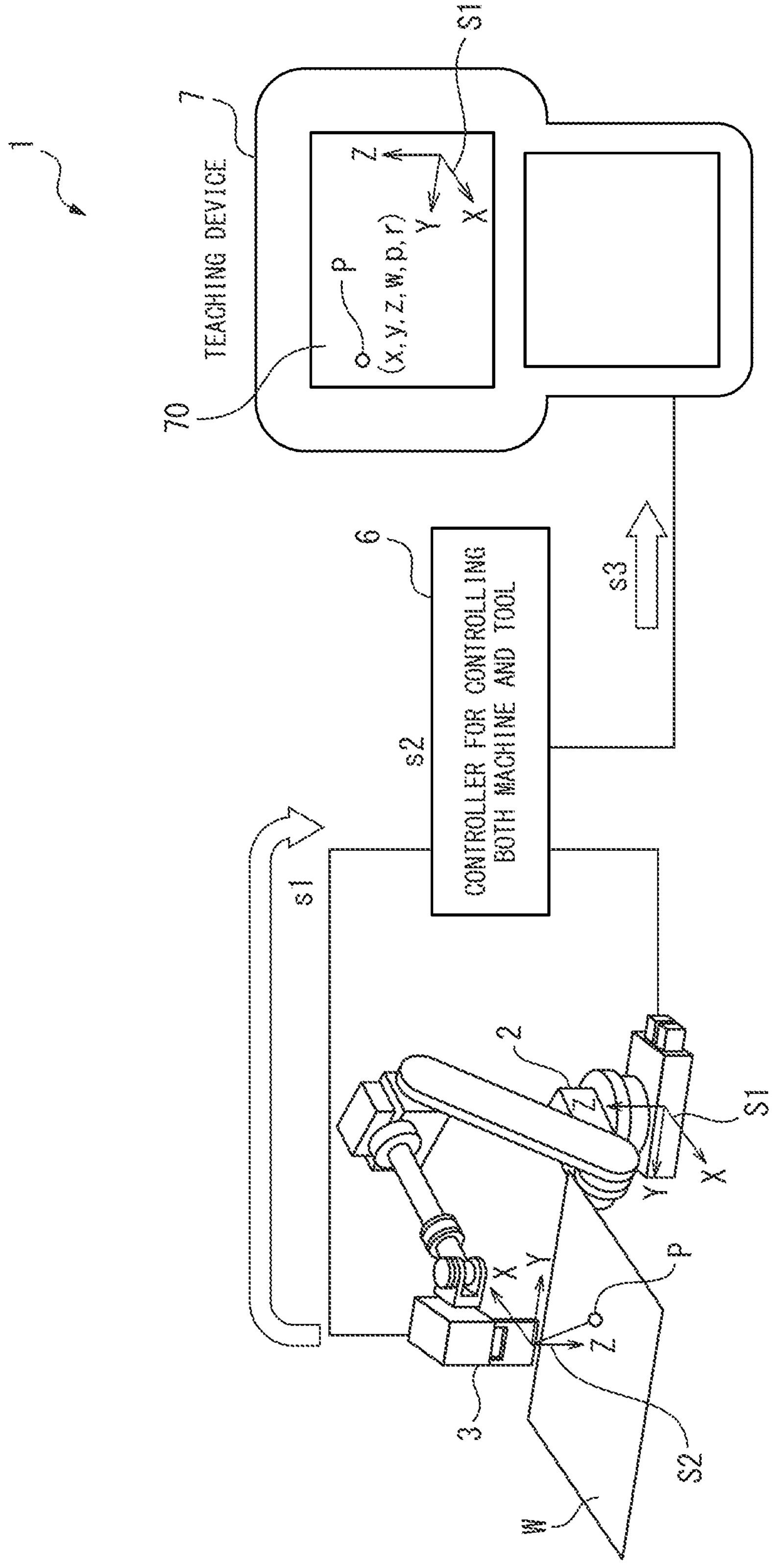
FIG. 9 is an operation view of the control system according to the third embodiment.

FIG. 9 is an operational view of the control system 1 of the third embodiment. In step s1, the controller 6 acquires the specific position and/or posture (for example, the current irradiation position P and irradiation posture of the beam) not common between the machine 2 and the tool 3 as the information ($x_{s2}$, $y_{s2}$, $z_{s2}$, $w_{s2}$, $p_{s2}$, $r_{s2}$) of the second coordinate system S2.

In step s2, the controller 6 converts and stores at least one of the specific position and posture (for example, the current irradiation position P and irradiation posture ($x_{s2}$, $y_{s2}$, $z_{s2}$, $w_{s2}$, $p_{s2}$, $r_{s2}$) of the beam) in the second coordinate system S2 to information (x, y, z, w, p, r) in the common coordinate system (for example, the first coordinate system S1) common between the machine 2 and the tool 3 based on the information (for example, the position and posture ($x_{offset}$, $y_{offset}$, $z_{offset}$, φ, θ, ψ) of the tool 3 in the first coordinate system S1) necessary for coordinate conversion. As the coordinate conversion formulas, for example, formulas 1 to 3 described above can be used. As a result, at least one of the specific position and posture (for example, the current irradiation position P and irradiation posture of the beam) not common between the machine 2 and the tool 3 can be shared as the information (x, y, z, w, p, r) in the common coordinate system common between the machine 2 and the tool 3, whereby convenience of the control system 1, which performs control using independent coordinate systems which are different from each other, is improved. For example, when the machine 2 moves the tool 3 (for example, modifies the teaching of the machine 2), since at least one of the position and posture of the tool 3 changes, at least one of the specific position and posture (for example, the current irradiation position P and irradiation posture of the beam) in the second coordinate system S2 also changes, but if the processing of steps s1 and s2 is executed, at least one of the specific position and posture (for example, the current irradiation position P and irradiation posture of the beam) not common between the machine 2 and the tool 3 can be shared as the information (x, y, z, w, p, r) in the common coordinate system common between the machine 2 and the tool 3.

In step s3, the teaching device 7 displays at least one of the specific position and posture (for example, the current irradiation position P and irradiation posture of the beam) received from the controller 6 as the information (x, y, z, w, p, r) in the common coordinate system. As a result, the user can confirm, on the teaching device 7, at least one of the specific position and posture not common between the machine 2 and the tool 3 as the information (x, y, z, w, p, r) in the common coordinate system common between the machine 2 and the tool 3. For example, when the machine 2 moves the tool 3 (for example, modifies the teaching of the machine 2), since at least one of the position and posture of the tool 3 changes, the specific position and/or posture (for example, the current irradiation position P and irradiation posture of the beam) in the second coordinate system S2 also changes, but if the processing of steps s1 to s3 is executed, the user can confirm, on the teaching device 7, the at least one of the specific position and posture (for example, the current irradiation position P and irradiation posture of the beam) not common between the machine 2 and the tool 3 as the information (x, y, z, w, p, r) in the common coordinate system common between the machine 2 and the tool 3.

Figure 10:
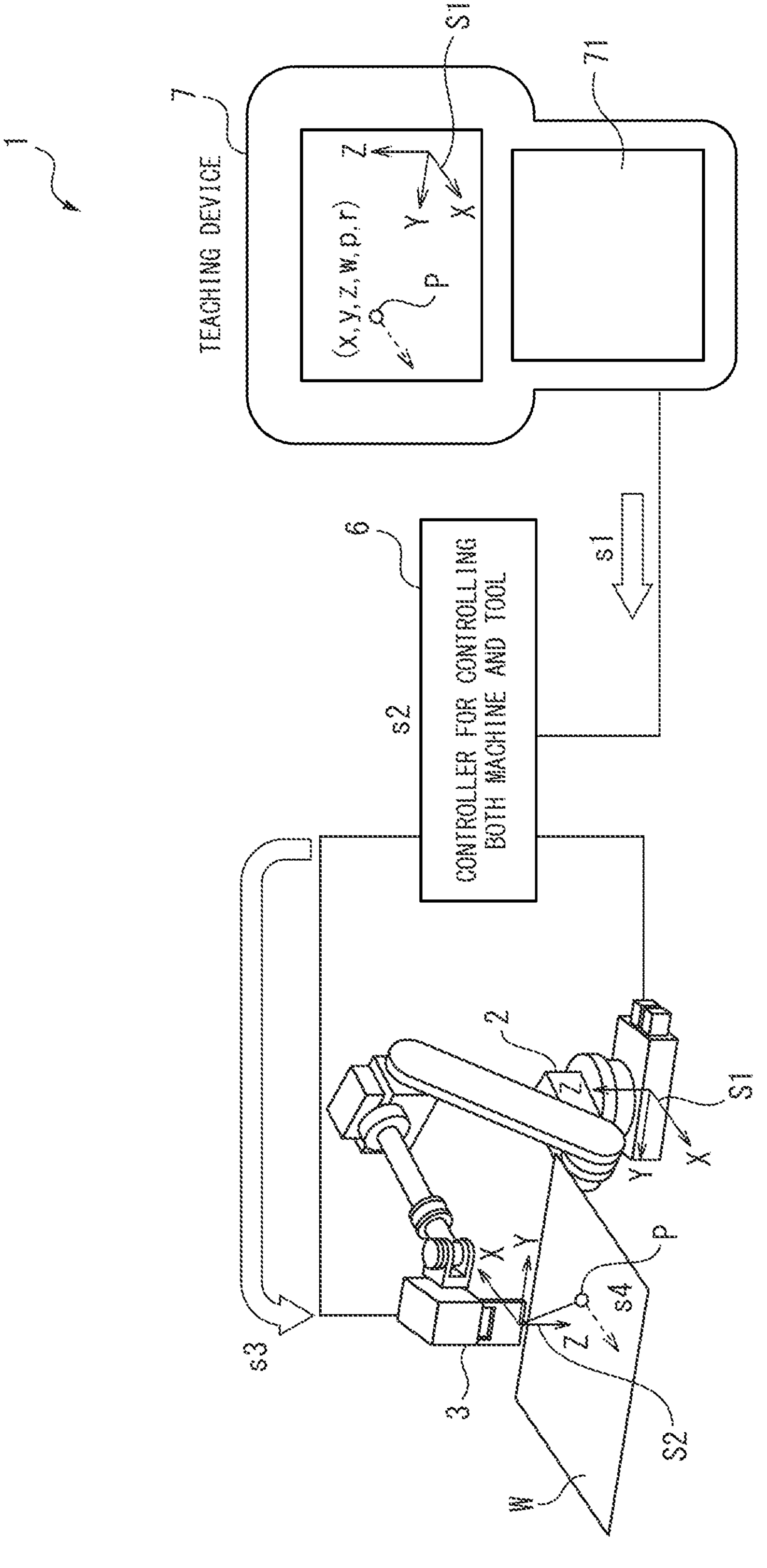
FIG. 10 is another operation view of the control system according to the third embodiment.

FIG. 10 is another operational view of the control system 1 of the third embodiment. In step s1, the teaching device 7 inputs a movement command (for example, at least one of target position and target posture) for moving at least one of the specific position and posture (for example, the irradiation position P and irradiation posture of the beam) not common between the machine 2 and the tool 3 as the information (x, y, z, w, p, r) in the common coordinate system common between the machine 2 and the tool 3, which is sent to the controller 6.

In step s2, the controller 6 converts the movement command (for example, at least one of the target position and target posture (x, y, z, w, p, r)) for the at least one of the specific position and posture (for example, the irradiation position P and irradiation posture of the beam) in the common coordinate system (for example, the first coordinate system S1) to the information ($x_{s2}$, $y_{s2}$, $z_{s2}$, $w_{s2}$, $p_{s2}$, $r_{s2}$) in the second coordinate system S2 based on the information necessary for coordinate conversion (for example, the position and posture ($x_{offset}$, $y_{offset}$, $z_{offset}$, φ, θ, ψ) of the tool 3 in the first coordinate system S1). As the coordinate conversion formulas, for example, formulas 4 to 6 described above can be used.

In step s3, the controller 6 controls the tool 3 in accordance with the movement command (for example, at least one of the target position and target posture ($x_{s2}$, $y_{s2}$, $z_{s2}$, $w_{s2}$, $p_{s2}$, $r_{s2}$)) for at least one of the specific position and posture (for example, the irradiation position P and irradiation posture of the beam) in the second coordinate system S2. For example, the controller 6 converts the movement command (for example, at least one of target position and target posture ($x_{s2}$, $y_{s2}$, $z_{s2}$, $w_{s2}$, $p_{s2}$, $r_{s2}$)) of at least one of the irradiation position P and the irradiation posture of the beam in the second coordinate system S2 to movement commands (for example, target positions) of the two motors of the scanning unit 31*b* to control the scanning unit 31*b*.

In step s4, the scanning unit 31*b* moves the irradiation position P of the beam in accordance with the motor movement commands (for example, the target positions). As described above, the teaching device 7 can teach the movement command (for example, at least one of the target position and the target posture) for at least one of the specific position and posture (for example, the irradiation position P and irradiation posture of the beam) not common between the machine 2 and the tool 3 as the information (x, y, z, w, p, r) in the common coordinate system common between the machine 2 and the tool 3, whereby the convenience of the control system 1, which controls using independent coordinate systems which are different from each other, is further improved.

Figure 11:
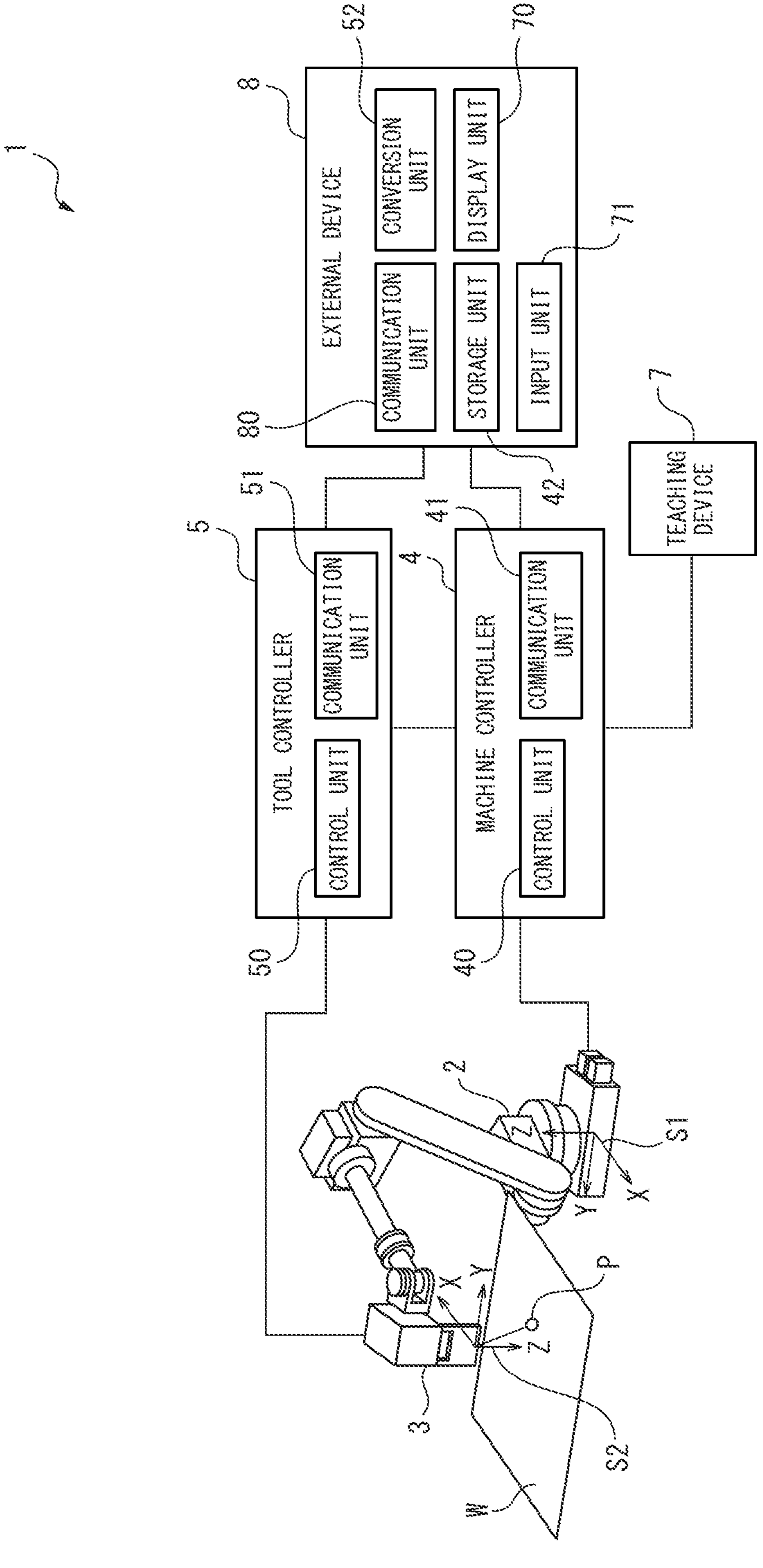
FIG. 11 is a configuration view of a control system according to a fourth embodiment.

The control system 1 of a fourth embodiment will be described below. FIG. 11 is a configuration view of the control system 1 of the fourth embodiment. The control system 1 of the fourth embodiment differs from the control system 1 of the first embodiment in that it comprises an external device 8 which is capable of connecting with at least one of the machine controller 4 and the tool controller 5. Specifically, in the control system 1 of the fourth embodiment, the external device 8 comprises a conversion unit 52 for converting coordinate systems, a storage unit 42 for storing various information, and a communication unit 80 for transmitting and receiving various information to and from other devices. The external device 8 may also comprise a display unit 70 for displaying various information and an input unit 71 for inputting various information. The input unit 71 of the external device 8 may input beam output conditions (for example, beam power, oscillation frequency, duty ratio, etc.) by means of user operation.

The external device 8 comprises a computer device (not illustrated) including a processor such as a CPU (central processing unit) for executing programs, RAM (random access memory), ROM (read-only memory) and other memories. The "units" of the external device 8 are composed of, for example, program modules executed by the processor, but may be composed of one or more semiconductor integrated circuits or other hardware which does not execute a program. The other configurations of the control system 1 of the fourth embodiment are identical to the configurations of the control system 1 of the first embodiment, and thus, description thereof has been omitted.

Figure 12:
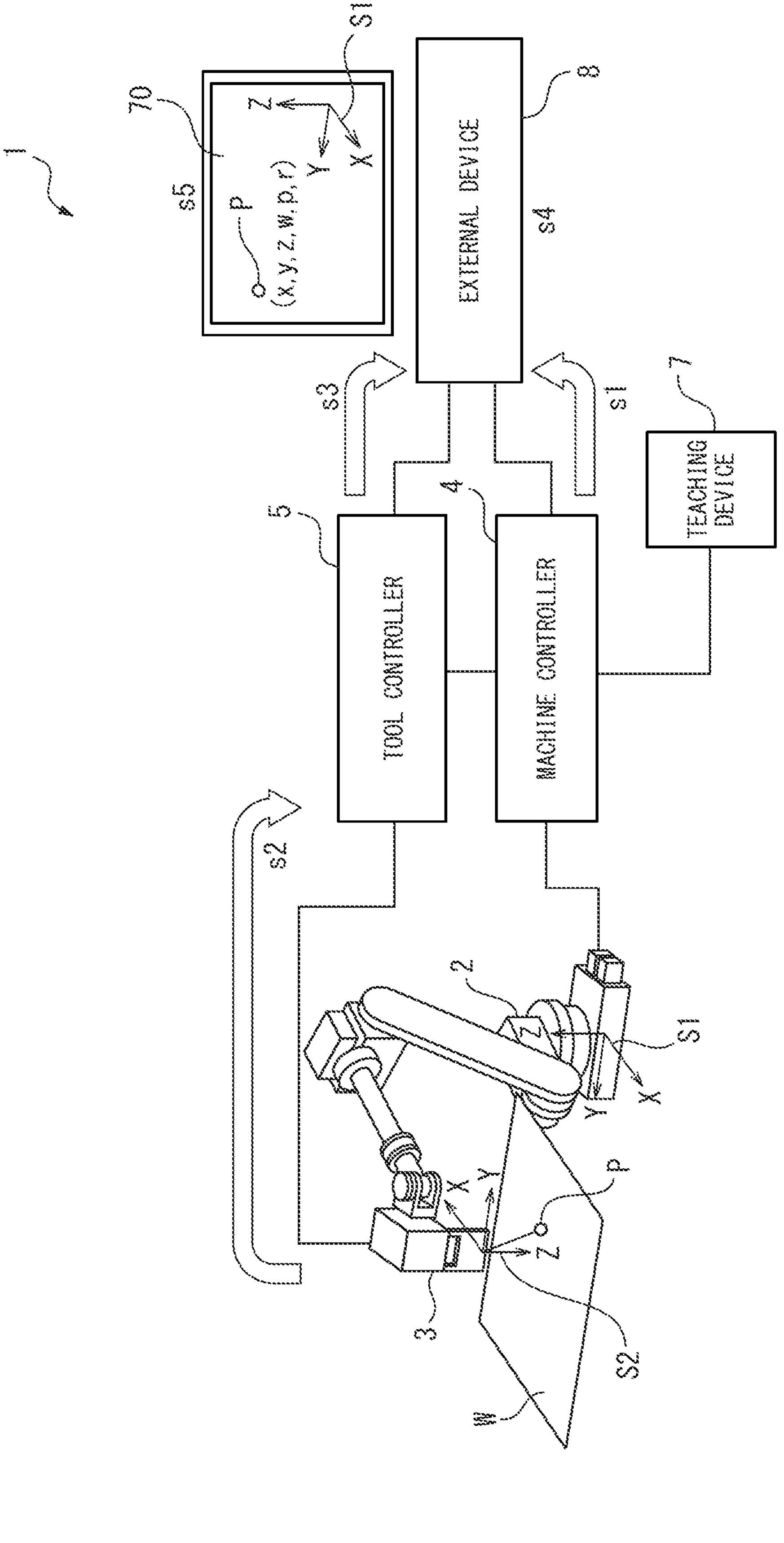
FIG. 12 is an operation view of the control system according to the fourth embodiment.

FIG. 12 is an operational view of the control system 1 of the fourth embodiment. In step s1, the machine controller 4 sends the information necessary for coordinate conversion (for example, the position and posture ($x_{offset}$, $y_{offset}$, $z_{offset}$, φ, θ, ψ) of the tool 3 in the first coordinate system S1) to the external device 8.

In step s2, the tool controller 5 acquires at least one of the specific position and posture (for example, the current irradiation position P and irradiation posture of the beam) not common between the machine 2 and the tool 3 as information ($x_{s2}$, $y_{s2}$, $z_{s2}$, $w_{s2}$, $p_{s2}$, $r_{s2}$) in the second coordinate system S2.

In step s3, the tool controller 5 sends, to the external device 8, at least one of the specific position and posture (for example, the current irradiation position P and irradiation posture of the beam) not common between the machine 2 and the tool 3 as the information ($x_{s2}$, $y_{s2}$, $z_{s2}$, $w_{s2}$, $p_{s2}$, $r_{s2}$) in the second coordinate system S2.

In step s4, the external device 8 converts and stores the specific position and posture (for example, the current irradiation position P and irradiation posture ($x_{s2}$, $y_{s2}$, $z_{s2}$, $w_{s2}$, $p_{s2}$, $r_{s2}$) of the beam) in the second coordinate system S2 received from the tool controller 5 to information (x, y, z, w, p, r) in the common coordinate system (for example, the first coordinate system S1) common between the machine 2 and the tool 3 based on the information (for example, the position and posture ($x_{offset}$, $y_{offset}$, $z_{offset}$, φ, θ, ψ) of the tool 3 in the first coordinate system S1) necessary for coordinate conversion received from the machine controller 4. As the coordinate conversion formulas, for example, formulas 1 to 3 described above can be used. As a result, the specific position and posture (for example, the current irradiation position P and irradiation posture of the beam) not common between the machine 2 and the tool 3 can be shared as the information (x, y, z, w, p, r) in the common coordinate system common between the machine 2 and the tool 3, whereby convenience of the control system 1, which performs control using independent coordinate systems which are different from each other, is improved. For example, when the machine 2 moves the tool 3 (for example, modifies the teaching of the machine 2), since at least one of the position and posture of the tool 3 changes, at least one of the specific position and posture (for example, the current irradiation position P and irradiation posture of the beam) in the second coordinate system S2 also changes, but if the processing of steps s1 to s4 is executed, at least one of the specific position and posture (for example, the irradiation position P and irradiation posture of the beam) not common between the machine 2 and the tool 3 can be shared as the information (x, y, z, w, p, r) in the common coordinate system common between the machine 2 and the tool 3.

In step s5, the external device 8 displays the stored at least one of the specific position and posture (for example, the current irradiation position P and irradiation posture of the beam) as the information (x, y, z, w, p, r) in the common coordinate system. As a result, the user can confirm, on the external device 8, at least one of the specific position and posture not common between the machine 2 and the tool 3 as the information (x, y, z, w, p, r) in the common coordinate system common between the machine 2 and the tool 3. For example, when the machine 2 moves the tool 3 (for example, modifies the teaching of the machine 2), since at least one of the position and posture of the tool 3 changes, the specific position and/or posture (for example, the current irradiation position P and irradiation posture of the beam) in the second coordinate system S2 also changes, but if the processing of steps s1 to s5 is executed, the user can confirm, on the external device 8, the at least one of the specific position and posture (for example, the current irradiation position P and irradiation posture of the beam) not common between the machine 2 and the tool 3 as the information (x, y, z, w, p, r) in the common coordinate system common between the machine 2 and the tool 3.

Figure 13:
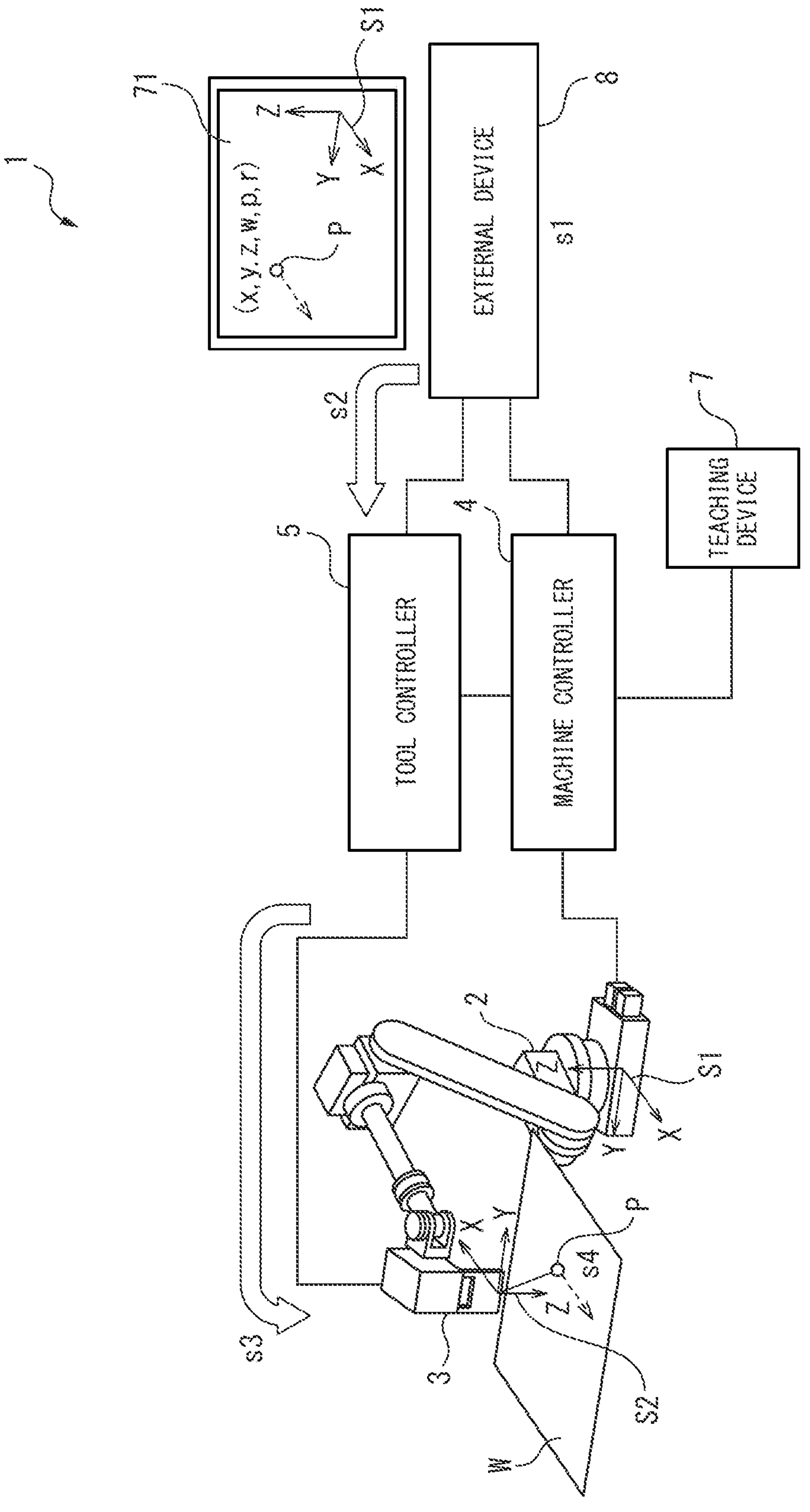
FIG. 13 is another operation view of the control system according to the fourth embodiment.

FIG. 13 is another operational view of the control system 1 of the fourth embodiment. In step s1, the external device 8 inputs a movement command (for example, at least one of target position and target posture) for moving at least one of the specific position and posture (for example, the irradiation position P and irradiation posture of the beam) not common between the machine 2 and the tool 3 as the information (x, y, z, w, p, r) in the common coordinate system common between the machine 2 and the tool, and converts the movement command (for example, at least one of the target position and target posture (x, y, z)) for the at least one of the specific position and posture (for example, the irradiation position P and irradiation posture of the beam) in the common coordinate system (for example, the first coordinate system S1) to information ($x_{s2}$, $y_{s2}$, $z_{s2}$, $w_{s2}$, $p_{s2}$, $r_{s2}$) in the second coordinate system S2 based on the information necessary for coordinate conversion (for example, the position and posture ($x_{offset}$, $y_{offset}$, $z_{offset}$, φ, θ, ψ) of the tool 3 in the first coordinate system S1). As the coordinate conversion formulas, for example, formulas 4 to 6 described above can be used.

In step s2, the external device 8 sends the movement command (for example, at least one of the target position and target posture ($x_{s2}$, $y_{s2}$, $z_{s2}$, $w_{s2}$, $p_{s2}$, $r_{s2}$)) for at least one of the specific position and posture (for example, the irradiation position P and irradiation posture of the beam) in the second coordinate system S2 to the tool controller 5.

In step s3, the tool controller 5 controls the tool 3 in accordance with the movement command (for example, at least one of the target position and target posture ($x_{s2}$, $y_{s2}$, $z_{s2}$, $w_{s2}$, $p_{s2}$, $r_{s2}$)) for at least one of the specific position and posture (for example, the irradiation position P and irradiation posture of the beam) in the second coordinate system S2. For example, the tool controller 5 converts the movement command (for example, at least one of target position and target posture ($x_{s2}$, $y_{s2}$, $z_{s2}$, $w_{s2}$, $p_{s2}$, $r_{s2}$)) of at least one of the irradiation position P and the irradiation posture of the beam in the second coordinate system S2 to movement commands (for example, target positions) of the two motors of the scanning unit 31*b* to control the scanning unit 31*b*.

In step s4, the scanning unit 31*b* moves the irradiation position P of the beam in accordance with the motor movement commands (for example, the target positions). As described above, the external device 8 can input the movement command (for example, at least one of the target position and the target posture) for at least one the specific position and posture (for example, the irradiation position P and irradiation posture of the beam) not common between the machine 2 and the tool 3 as the information (x, y, z, w, p, r) in the common coordinate system common between the machine 2 and the tool 3, whereby the convenience of the control system 1, which controls using independent coordinate systems which are different from each other, is further improved.

Figure 14:
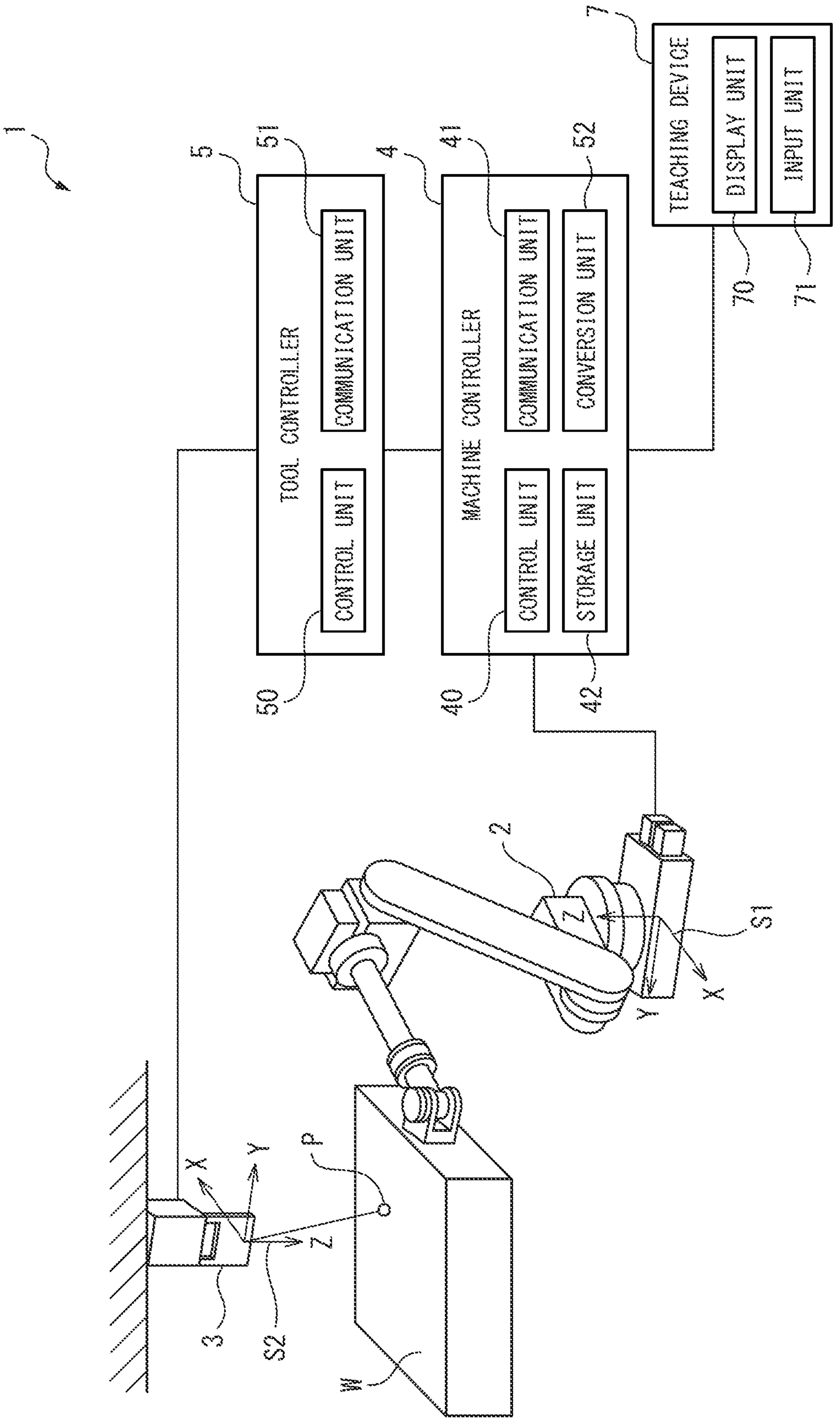
FIG. 14 is a configuration view of a control system according to a fifth embodiment.

The control system 1 of a fifth embodiment will be described below. FIG. 14 is a configuration view of the control system 1 of the fifth embodiment. The control system 1 of the fifth embodiment differs from the control system 1 of the first embodiment in that it comprises a machine 2 having a workpiece W and a tool 3 attached to a fixed point (for example, a ceiling, side wall, structural body, etc.). The machine 2 carries the workpiece W, and the tool 3 performs operations (for example, machining, measurement, observation, etc.) on the workpiece W arranged on the tip of the machine 2.

For example, when the machine 2 moves the workpiece W (for example, when the machine 2 modifies the teaching), since at least one of the position and posture of the workpiece W changes, it is necessary to change at least one of the current irradiation position P and irradiation posture of the beam in the second coordinate system S2. Thus, when the machine 2 moves the workpiece W, the tool controller 5 receives the position and posture of the workpiece W in the first coordinate system S1 from the machine controller 4, converts the position and posture of the workpiece W in the first coordinate system S1 to information in the second coordinate system S2, and generates movement commands (for example, at least one of the target position and target posture) for at least one of the irradiation position P and irradiation posture of the beam in the second coordinate system S2 based on the position and posture of the workpiece W in the second coordinate system S2 and the position and posture of the tool 3 in the second coordinate system S2. The tool controller 5 converts the movement command of at least one of irradiation position P and irradiation posture of beam in second coordinate system S2 (for example, at least one of target position and target posture) to movement commands (for example, target positions) of the two motors of scanning unit 31*b* to control the scanning unit 31*b*. Thus, the tool controller 5 always retains at least one of the current irradiation position P and irradiation posture of the beam in the second coordinate system S2. The other configurations of the control system 1 of the fifth embodiment are identical to those of the control system 1 of the first embodiment, and thus, description thereof has been omitted.

Figure 15:
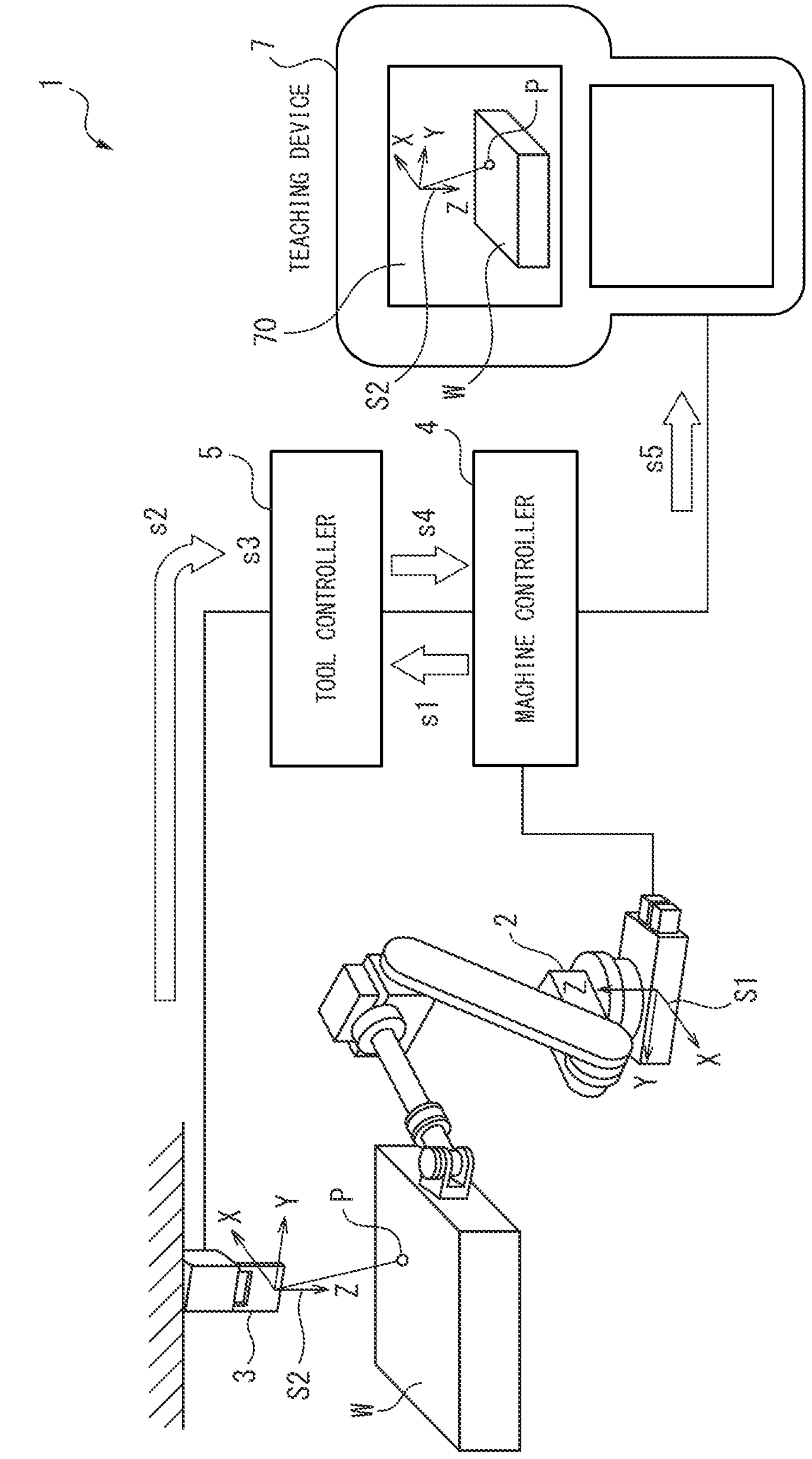
FIG. 15 is an operation view of the control system according to the fifth embodiment.

FIG. 15 is an operational view of the control system 1 of the fifth embodiment. In step s1, the machine controller 4 sends the information necessary for coordinate conversion (for example, the position and posture ($x_{offset}$, $y_{offset}$, $z_{offset}$, φ, θ, ψ) of the tool 3 in the first coordinate system S1) to the tool controller 5.

In step s2, the tool controller 5 acquires at least one of the specific position and posture (for example, the current irradiation position P and irradiation posture of the beam) not common between the machine 2 and the tool 3 as the information ($x_{s2}$, $y_{s2}$, $z_{s2}$, $w_{s2}$, $p_{s2}$, $r_{s2}$) of the second coordinate system S2.

In step s3, the tool controller 5 converts at least one of the specific position and posture (for example, the current irradiation position P and irradiation posture ($x_{s2}$, $y_{s2}$, $z_{s2}$, $w_{s2}$, $p_{s2}$, $r_{s2}$) of the beam) in the second coordinate system S2 to information (x, y, z, w, p, r) in the common coordinate system (for example, the first coordinate system S1) common between the machine 2 and the tool 3 based on the information (for example, the position and posture ($x_{offset}$, $y_{offset}$, $z_{offset}$, φ, θ, ψ) of the tool 3 in the first coordinate system S1) necessary for coordinate conversion received from the machine controller 4. As the coordinate conversion formulas, for example, formulas 1 to 3 described above can be used.

In step s4, the tool controller 5 sends to the machine controller 4 at least one of the specific position and posture (for example, the current irradiation position P and irradiation posture of the beam) not common between the machine 2 and the tool 3 as information (x, y, z, w, p, r) in the common coordinate system common between the machine 2 and the tool 3. The machine controller 4 stores at least one of the specific position and posture (for example, the current irradiation position P and irradiation posture of the beam) received from the tool controller 5 as the information (x, y, z, w, p, r) in the common coordinate system. As a result, the specific position and posture not common between the machine 2 and the tool 3 can be shared as the information (x, y, z, w, p, r) in the common coordinate system common between the machine 2 and the tool 3, whereby convenience of the control system 1, which performs control using independent coordinate systems which are different from each other, is improved. For example, when the machine 2 moves the workpiece W (for example, modifies the teaching of the machine 2), since at least one of the position and posture of the workpiece W changes, at least one of the specific position and posture (for example, the current irradiation position P and irradiation posture of the beam) in the second coordinate system S2 also changes, but if the processing of steps s1 to s4 is executed, the specific position and posture (for example, the current irradiation position P and irradiation posture of the beam) not common between the machine 2 and the tool 3 can be shared as the information (x, y, z, w, p, r) in the common coordinate system common between the machine 2 and the tool 3.

In step s5, the teaching device 7 displays at least one of the specific position and posture (for example, the current irradiation position P and irradiation posture of the beam) received from the machine controller 4 as the information (x, y, z, w, p, r) in the common coordinate system. As a result, the user can confirm, on the teaching device 7, the specific position and posture not common between the machine 2 and the tool 3 as the information (x, y, z, w, p, r) in the common coordinate system common between the machine 2 and the tool 3. For example, when the machine 2 moves the workpiece W, since at least one of the position and posture of the workpiece W changes, at least one of the specific position and posture (for example, the current irradiation position P and irradiation posture of the beam) in the second coordinate system S2 also changes, but if the processing of steps s1 to s5 is executed, the user can confirm, on the teaching device 7, the at least one of the specific position and posture (for example, the current irradiation position P and irradiation posture of the beam) not common between the machine 2 and the tool 3 as the information (x, y, z, w, p, r) in the common coordinate system common between the machine 2 and the tool 3.

Figure 16:
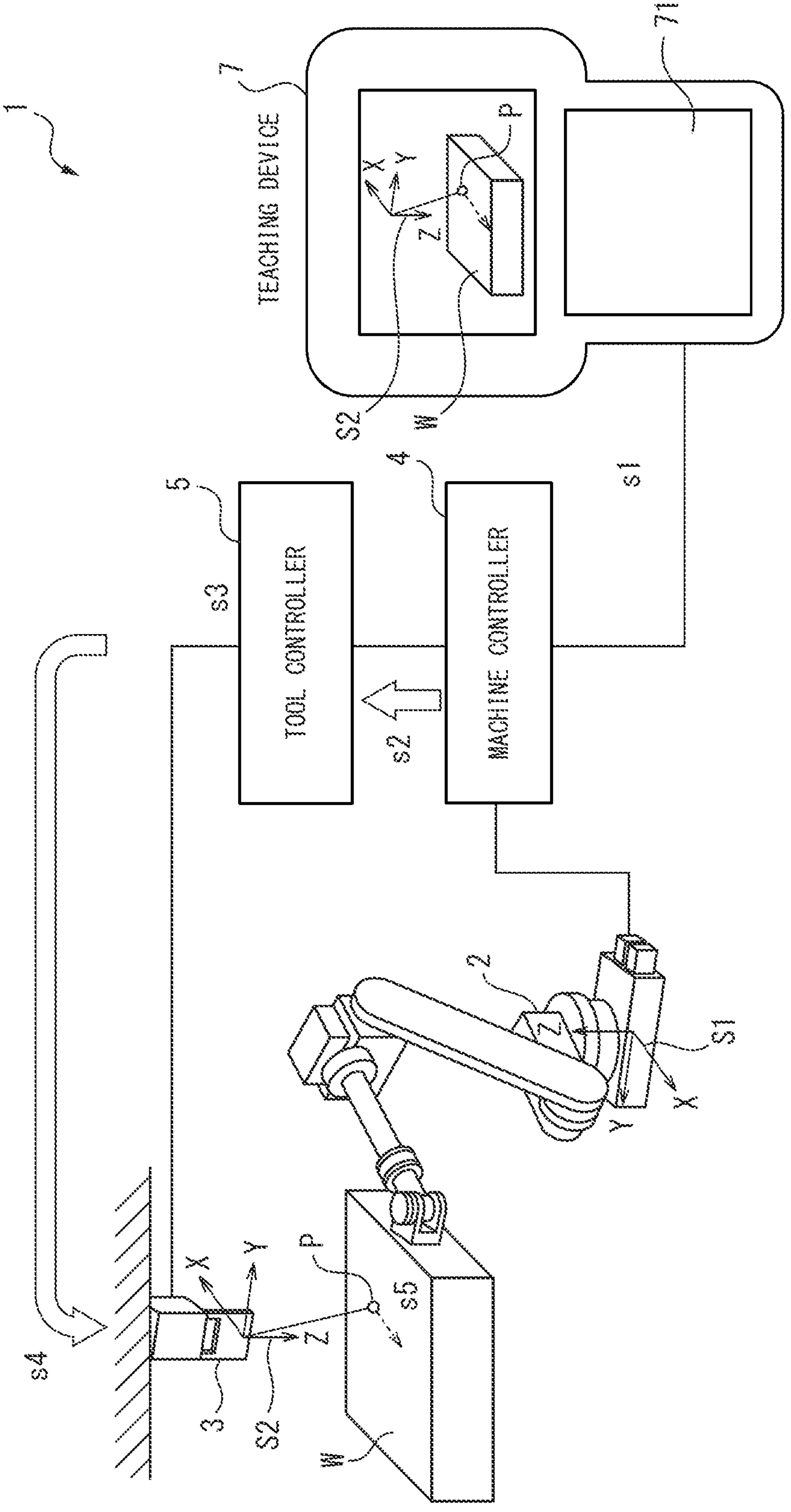
FIG. 16 is another operation view of the control system according to the fifth embodiment.

FIG. 16 is another operational view of the control system 1 of the fifth embodiment. In step s1, the teaching device 7 inputs a movement command (for example, at least one of target position and target posture) for moving at least one of the specific position and posture (for example, the irradiation position P and irradiation posture of the beam) not common between the machine 2 and the tool 3 as the information (x, y, z, w, p, r) in the common coordinate system common between the machine 2 and the tool, which is sent to the machine controller 4.

In step s2, the machine controller 4 sends the movement command (for example, the target position and target posture (x, y, z, w, p, r)) for at least one of the specific position and posture (for example, the irradiation position P and irradiation posture of the beam) in the common coordinate system (for example, the first coordinate system S1) and the information necessary for coordinate conversion (for example, the position and posture ($x_{offset}$, $y_{offset}$, $z_{offset}$, φ, θ, ψ) of the tool 3 in the first coordinate system S1) to the tool controller 5.

In step s3, the tool controller 5 converts the movement command (for example, at least one of the target position and target posture (x, y, z, w, p, r)) for the at least one of the specific position and posture (for example, the irradiation position P and irradiation posture of the beam) in the common coordinate system (for example, the first coordinate system S1) to the information ($x_{s2}$, $y_{s2}$, $z_{s2}$, $w_{s2}$, $p_{s2}$, $r_{s2}$) in the second coordinate system S2 based on the information necessary for coordinate conversion (for example, the position and posture ($x_{offset}$, $y_{offset}$, $z_{offset}$, φ, θ, ψ) of the tool 3 in the first coordinate system S1) received from the machine controller 4. As the coordinate conversion formulas, for example, formulas 4 to 6 described above can be used.

In step s4, the tool controller 5 controls the tool 3 in accordance with the movement command (for example, at least one of the target position and target posture ($x_{s2}$, $y_{s2}$, $z_{s2}$, $w_{s2}$, $p_{s2}$, $r_{s2}$)) for at least one of the specific position and posture (for example, the irradiation position P and irradiation posture of the beam) in the second coordinate system S2. For example, the tool controller 5 converts the movement command (for example, at least one of the target position and target posture ($x_{s2}$, $y_{s2}$, $z_{s2}$, $w_{s2}$, $p_{s2}$, $r_{s2}$)) of at least one of the irradiation position P and the irradiation posture of the beam in the second coordinate system S2 to movement commands (for example, target positions) of the two motors of the scanning unit 31*b* to control the scanning unit 31*b*.

In step s5, the scanning unit 31*b* moves the irradiation position P of the beam in accordance with the motor movement commands (for example, the target positions). As described above, the teaching device 7 can teach the movement command (for example, at least one of the target position and the target posture) for at least one the specific position and posture (for example, the irradiation position P and irradiation posture of the beam) not common between the machine 2 and the tool 3 as the information (x, y, z, w, p, r) in the common coordinate system common between the machine 2 and the tool 3, whereby the convenience of the control system 1, which controls using independent coordinate systems which are different from each other, is further improved.

According to the embodiments described above, convenience in terms of use of the technology for controlling by using independent coordinate systems which are different from each other can be improved.

The programs executed by the processor described above may be recorded and provided on a computer-readable non-transitory recording medium, such as a CD-ROM, or alternatively, may be distributed and provided from a server device on a WAN (wide area network) or LAN (local area network) via a wire or wirelessly.

Although various embodiments have been described herein, the present invention is not limited to the embodiments described above, and it should be recognized that various changes can be made within the scope described in the claims.

REFERENCE SIGNS LIST

1 control system
2 machine
20 to 24 link
3 tool
30 optical fiber
31 machining head
31*a* focusing unit
31*b* scanning unit
4 machine controller (controller)
40 control unit
41 communication unit
42 storage unit
5 tool controller (controller)
50 control unit
51 communication unit
52 conversion unit
6 controller controlling both machine and tool (controller)
60 control unit
61 communication unit
7 teaching device
70 display unit
71 input unit
8 external device
80 communication unit
S1 first coordinate system
S2 second coordinate system
F focal position
P irradiation position
W workpiece

The invention claimed is:

1. A control system, comprising a machine and a tool which are driven and controlled using independent coordinate systems which are different from each other, and a controller which controls at least one of the machine and the tool, the control system comprising:

a conversion unit for converting coordinate systems, and a storage unit in which a specific irradiation position and irradiation posture of a beam not common between the machine and the tool are stored as information of a common coordinate system which is common between the machine and the tool, wherein the specific position and posture are shared between the machine and the tool, and wherein the controller controls at least one of the machine and the tool in accordance with the independent coordinate systems.

2. The control system according to claim 1, wherein the tool comprises an output unit for outputting a beam, and the specific position and posture is an irradiation position and irradiation posture of the beam.

3. The control system according to claim 1, wherein the tool comprises a scanning unit for scanning the beam.

4. The control system according to claim 1, wherein the tool comprises a focusing unit for focusing a beam, and the specific position and posture is a focal position and focal posture of the beam.

5. The control system according to claim 1, further comprising at least one of a display unit for displaying the specific position and posture as information in the common coordinate system, and an input unit for inputting a movement command for the specific position and posture as information in the common coordinate system.

6. The control system according to claim 5, comprising a teaching device which is connected to the controller, wherein the teaching device comprises at least one of the display unit and the input unit.

7. The control system according to claim 5, wherein the tool comprises an output unit for outputting a beam, and the input unit further inputs output conditions of the beam.

8. The control system according to claim 1, wherein the controller comprises the conversion unit.

9. The control system according to claim 1, comprising an external device which is connected to the controller, wherein the external device comprises the conversion unit.

10. A controller for controlling at least one of a machine and a tool which are driven and controlled using independent coordinate systems which are different from each other, the controller comprising:

a conversion unit for converting coordinate systems, and a storage unit in which a specific irradiation position and irradiation posture of a beam not common between the machine and the tool are stored as information of a common coordinate system which is common between the machine and the tool, wherein the specific position and posture are shared between the machine and the tool, and wherein the controller controls at least one of the machine and the tool in accordance with the independent coordinate systems.

11. An external device which is connected to a controller for controlling at least one of a machine and a tool which are driven and controlled using independent coordinate systems which are different from each other, the external device comprising:

a conversion unit for converting coordinate systems, and a storage unit in which a specific irradiation position and irradiation posture of a beam not common between the machine and the tool are stored as information of a common coordinate system which is common between the machine and the tool, wherein the specific position and posture are shared between the machine and the tool, and wherein the controller controls at least one of the machine and the tool in accordance with the independent coordinate systems.

* * * * *